United States Patent
Munafo et al.

(10) Patent No.: US 11,119,839 B2
(45) Date of Patent: Sep. 14, 2021

(54) REMOTE DEBUGGING AND MANAGEMENT

(71) Applicant: Intel Corporation, Santa Clara, CA (US)

(72) Inventors: Tamir Damian Munafo, Naale (IL); Yuli Barcohen, Nokdim (IL); Dor Levy, Jerusalem (IL); Nachum Barcohen, Nokdim (IL); Eli Elik Kupermann, Maale Adumim (IL); Fred Bolay, Folsom, CA (US); Elad Dabool, Katzrin (IL)

(73) Assignee: Intel Corporation, Santa Clara, CA (US)

(*) Notice: Subject to any disclaimer, the term of this patent is extended or adjusted under 35 U.S.C. 154(b) by 39 days.

(21) Appl. No.: 16/317,090

(22) PCT Filed: Aug. 3, 2017

(86) PCT No.: PCT/US2017/045270
§ 371 (c)(1),
(2) Date: Jan. 11, 2019

(87) PCT Pub. No.: WO2018/027018
PCT Pub. Date: Feb. 8, 2018

(65) Prior Publication Data
US 2019/0227908 A1 Jul. 25, 2019

Related U.S. Application Data

(60) Provisional application No. 62/370,476, filed on Aug. 3, 2016.

(51) Int. Cl.
*G06F 11/07* (2006.01)
*G06F 11/36* (2006.01)

(52) U.S. Cl.
CPC ...... *G06F 11/0778* (2013.01); *G06F 11/0706* (2013.01); *G06F 11/0748* (2013.01); *G06F 11/366* (2013.01)

(58) Field of Classification Search
CPC ............ G06F 11/0778; G06F 11/3656; G06F 11/366; H04L 51/04
See application file for complete search history.

(56) References Cited

U.S. PATENT DOCUMENTS 7,539,724 B1 * 5/2009 Callaghan .......... G05B 19/4185
709/205
7,783,932 B1 8/2010 Eigen et al.
(Continued)

FOREIGN PATENT DOCUMENTS

| CN | 109564539 A | 4/2019 |
| JP | 2012079130 A | 4/2012 |
| WO | WO-2018027018 A1 | 2/2018 |

OTHER PUBLICATIONS

"International Application Serial. No. PCT/US2017/045270, International Search Report dated Nov. 10, 2017", 5 pgs.
(Continued)

*Primary Examiner* — Joseph R Kudirka
(74) *Attorney, Agent, or Firm* — Schwegman Lundberg & Woessner, P.A.

(57) ABSTRACT

A technical problem faced when remotely controlling or debugging electronic devices is that remote control or debugging often requires a direct connection. However, debugging ports are inaccessible on many devices. Technical solutions described herein provide systems and methods for secure communication via existing communication infrastructure (e.g., public instant messenger (IM)), providing various debugging abilities including debugging and file sharing. Technical solutions described herein also provide systems and methods for debugging based on remote device
(Continued)

memory state collection and sending for embedded or IoT devices. This solution avoids a hardware debugging connection by using a debugging methodology resident on the device to read and dump the relevant memory, registers, and other device state information in a secure and automated manner.

23 Claims, 12 Drawing Sheets

(56) References Cited

U.S. PATENT DOCUMENTS

| | | | | |
|---|---|---|---|---|
| 7,801,946 | B2* | 9/2010 | Bearman | H04L 51/18 |
| | | | | 709/203 |
| 8,473,251 | B1 | 6/2013 | Noth et al. | |
| 8,528,039 | B2* | 9/2013 | Chakarapani | H04N 17/004 |
| | | | | 725/144 |
| 8,584,098 | B2* | 11/2013 | Schmelter | G06F 11/3466 |
| | | | | 717/130 |
| 8,789,020 | B2* | 7/2014 | Chung | G06F 11/3664 |
| | | | | 717/125 |
| 2005/0102362 | A1* | 5/2005 | Price | G06Q 10/107 |
| | | | | 709/206 |
| 2005/0144507 | A1* | 6/2005 | Lee | G06F 11/362 |
| | | | | 714/4.1 |
| 2009/0037775 | A1* | 2/2009 | Chi | G06Q 10/107 |
| | | | | 714/38.14 |
| 2009/0082008 | A1* | 3/2009 | Thorell | G06F 11/362 |
| | | | | 455/423 |
| 2012/0084757 | A1* | 4/2012 | Tamiya | G06F 11/3656 |
| | | | | 717/124 |
| 2012/0117541 | A1 | 5/2012 | Bates | |

OTHER PUBLICATIONS

"International Application Serial No. PCT/US2017/045270, Written Opinion dated Nov. 10, 2017", 8 pgs.

"International Application Serial No. PCT/US2017/045270, International Preliminary Report on Patentability dated Feb. 14, 2019", 8 pgs.

"Indian Application Serial No. 201947000289, First Examination Report dated Apr. 16, 2021", 7 pgs.

* cited by examiner

REMOTE DEBUGGING AND MANAGEMENT

PRIORITY

This patent application is a U.S. National Stage Application under 35 U.S.C. 371 from International Application No. PCT/US2017/045270, filed Aug. 3, 2017, which claims the benefit of priority to U.S. Provisional Application Ser. No. 62/370,476, filed Aug. 3, 2016, each of which are incorporated by reference herein in their entirety.

TECHNICAL FIELD

Embodiments described herein generally relate to remote debugging and management of electronic devices.

BACKGROUND

There is an increasing demand for remote debugging and management of electronic devices, including remote or autonomous electronic devices. A user may interact with an electronic device by connecting directly to the electronic device (e.g., device under test). However, such direct connections usually require either that the device is sent to the manufacturer, or that the manufacturer send an engineer or technician to the electronic device location.

Some existing solutions for a direct connection include sharing an operating system desktop over a virtual private network (VPN). However, a VPN configuration often requires VPN licensing for both the seller and buyer of the electronic device under test. A VPN configuration also requires a network topology change at the customer site that may not be approved by customers. Additionally, many customers require secured connectivity, however VPNs and many other existing debugging solutions do not provide secured connectivity.

Some debugging requires access to low-level device information, such as device software memory state, hardware memory state, firmware memory state, error state, or other device information. To debug such low-level device information, a debug engineer may connect directly to the device and use a low-level debugging methodology, such as source-code-level debugging or code-level tracing (e.g., "printf" tracing). The direct device connection may also require a specific debugger device connection (e.g., a joint test action group (JTAG) debugger device), and may require development of a specific script to read or dump the device memory. For complex environments, such as embedded controllers and networked physical devices, the interaction among multiple devices may introduce multiple types of low-level device information for differing types of devices. The complexity of such environments will only increase as the number of embedded or networked physical devices and the number of device features increases. To debug such a complex environment, multiple hardware experts or software experts may need to be present to connect to the device and execute one or more low-level debug methodologies.

It is desirable to provide an improved solution for remote debugging and management of electronic devices.

DESCRIPTION OF EMBODIMENTS

Figure 1:
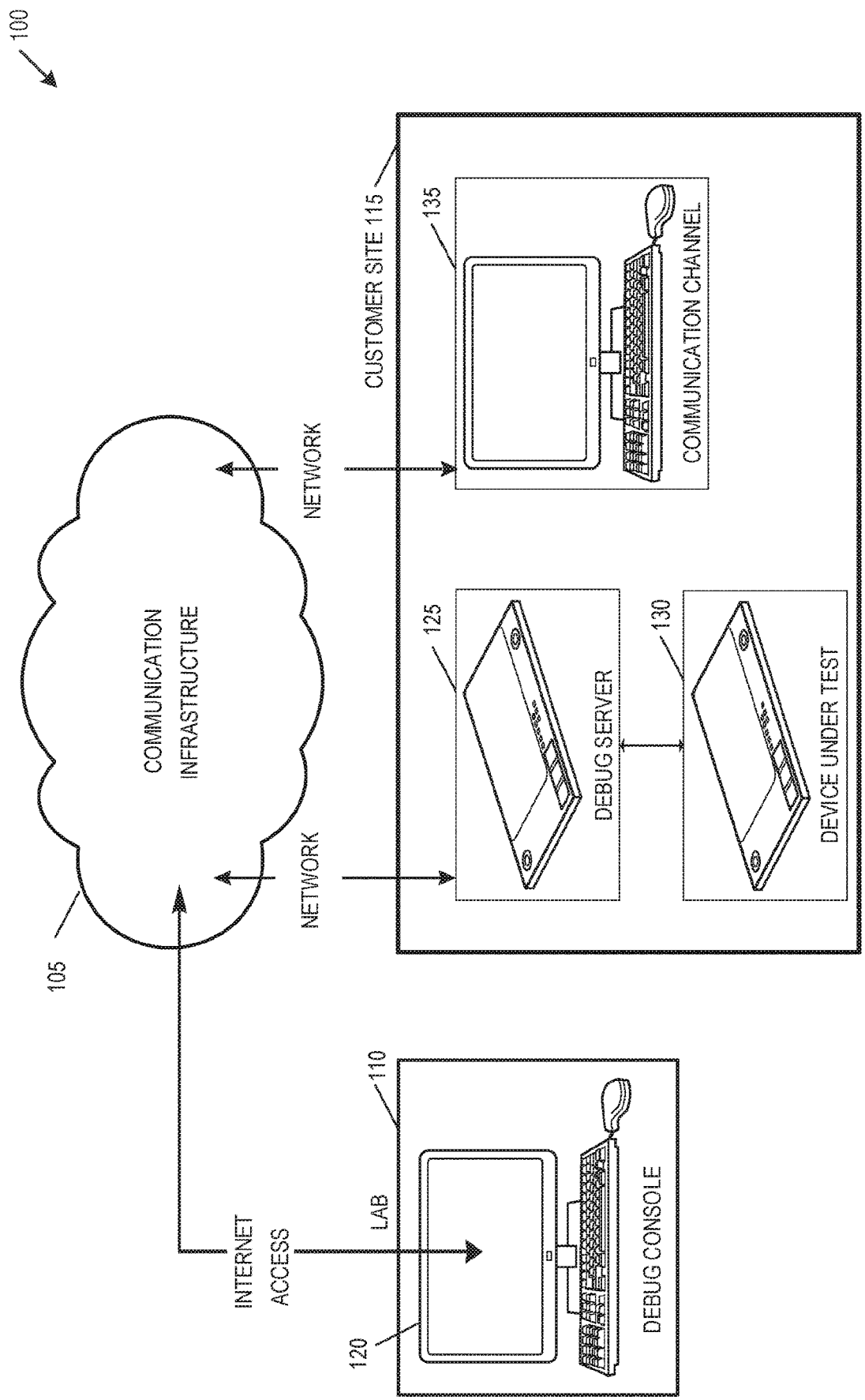
FIG. 1 is a block diagram of a direct device debugging topology, in accordance with at least one embodiment.

A technical problem faced when remotely controlling or debugging electronic devices is that remote control or debugging often requires a direct connection. In various embodiments, technical solutions described herein provide systems and methods for end-to-end encrypted communication via existing public or private communication infrastructure (e.g., instant messenger (IM)). These solutions provide various debugging abilities including debugging and file sharing, and do not require VPNs, firewalls, security gates, or other specific network reconfiguration before connecting remotely to a system. These solutions support communication between an embedded or networked device and a host device (e.g., laptop, desktop, or server), and support communication between two embedded or networked devices. These solutions are useful in various debugging use cases, including personal computers (PCs), servers, manufacturing equipment, embedded devices, and "internet of things" (IoT) devices. In contrast with general purpose PC processors, embedded devices may include a computing device with a dedicated function, such as a thermostat, a microcontroller, a smartwatch, a vehicle computer, or another dedicated computing device. IoT devices may include various types of network-connected electronics, such as a processor, a sensor, an output device, or other electronics. Networked devices may be referred to as networked devices, smart devices, or connected devices.

In contrast with complex, expensive, and often impractical VPN connection solutions, the encrypted debugging communication implementation provides a secure remote connection with no network configuration required. In contrast with sending an engineer to debugging a device under test, the present implementations enable an engineer to remotely debug the device under test and provide real-time (or near real-time) solutions to the customer. In addition, due to the usage of communication infrastructure, customers will not be required to modify their network configuration, thereby avoiding the need to open special ports or install specific VPN devices.

In an embodiment, technical solutions described herein provide systems and methods for debugging based on remote device memory state collection and sending (e.g., core memory "read and dump") for embedded or IoT devices. In particular, many IoT and embedded devices do not provide debugging ports (e.g., JTAG connections) or do not provide easy access to debugging ports. For example, the debugging contacts for a device may include two through-hole vias on a device's printed circuit board, requiring a user to solder contacts to the vias to connect a debugger. In various embodiments, IoT and embedded devices may not provide a debugging port, a communication port (e.g., Ethernet connection), an interface port (e.g., USB, Fire-Wire), a user interface (e.g., button, touchscreen), or a display. A technical implementation described herein avoids a hardware connection by using a debugging methodology resident on the device to read and dump the relevant memory, registers, and other device state information in a secure and automated manner. This avoids the need to ship the device to a debugging location or send a debugging engineer to the device location, and avoids have a debugging engineer connect the device physically to a physical debugging device (e.g., via JTAG debugger) to read and dump the memory. The solution provides a convenient way to receive various types of debug information together while maintaining the security of the system. Such an implementation, or variants thereof, may be used with any high-level or low-level debugging methodology, such as a debugging service, a tracing application programming interface (API), an exception handler, source-code-level debugging, tracing, post-failure debugging, and other debugging methodologies.

The technical solutions described herein address at least three distinct phrases of device development, including the development phase, the mass production phase, and the validation and field trial phase. In the development phase, the device is at the customer lab, where it is impractical or impossible to provision a secure connection from the service provider lab to the customer lab. Within the development phase, the debug server is a separate computer connected to the device at the customer lab, such as shown in FIG. 1. In the validation and field trial phase, the debug server may include a simple computing device connected to a customer field product that includes a microprocessor and a network device, such as a mobile server with a wide area network (WAN) interface device. For example, the customer field product may include an unmanned aerial vehicle (UAV), which may be equipped with a mobile server (e.g., an Edison module) and a wireless network device. The customer field product may be deployed in the field but under supervision of customer's engineers. The customer infrastructure may be insufficient for configuring full features VPN and other security mechanisms required by remote debugging procedures or debugging standards. To enable debugging in the early stages of development (e.g., during boot), the server needs to be separate from the device under test. The costs associated with debugging during the validation and field trial phase are increased during the mass production phase. During mass production, the debug server software or hardware may be integrated into the customer device. In the mass production phase, the customer device may reside at the end-user premises, where the end-user premises may not provide a secure debugging infrastructure.

The following description and the drawings sufficiently illustrate specific embodiments to enable those skilled in the art to practice them. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a block diagram of a direct device debugging topology 100, in accordance with at least one embodiment. Topology 100 includes a debug console 120, which may be located in a lab 110 of a remote service provider. Topology 100 includes a debug server 125 connected to the debug console 120 via communication infrastructure 105 such as an instant messenger (IM) platform. The debug server 125 may be connected to the device under test 130, where the debug server 125 and device under test 130 may be located at a customer site 115 (e.g., customer business or home).

The debug server 125 includes the debugging software, the communication client (e.g., IM client), and the communication encryption keys, where the encryption keys may be pre-provisioned by the service provider. The communication client may interact with the debugging software, including sending debugging commands to the debugging software and receiving debugging output from the debugging software. In an embodiment, the communication client is implemented as a chatbot (e.g., IM bot, chatterbot) to execute programmatic functionality automatically in response to receiving a command from the debug console 120. The chatbot may communicate using a predetermined protocol, or may use a protocol that is provided to the chatbot via the communication client. Thus, an engineer that wishes to interrogate the device under test 130 may simply open an IM chat with the device 130 via the debug server 125 and "chat" with the device under test 130 to initiate debugging and retrieve debugging results. Further, by using an IM infrastructure, other engineers may join the conversation akin to a "group chat" with the device under test 130.

The debug console 120 may run the same tools as the debug server 125, thereby providing the same debugging experience to a debug console user as if the user were physically interacting with the debug server 125. The debug console user interface (UI) and communication client may be integrated into a single program, or the UI may send commands to the communication client, such as using an API or other programmatic interface.

Even when the debug console 120 is remote from the customer business or home 115, the debug console 120 user experience is substantially the same as if the device under test 130 were physically connected to the debug console 120. A debug console user may use a group chat mode that allows several engineers to connect to the same device under test 130, allowing each engineer to provide separate debugging. The communication client may provide instant messaging capabilities with access security, encryption, and other security measures. For example, the communication client may restrict access to a particular debug console 120 or device under test 130 based on a list of preapproved communication client contacts. The communication client may also encrypt each message sent and decrypt each message received, such as using previously provisioned cryptographic keys to perform symmetric-key cryptography. The communication client may use a combination of unencrypted and encrypted messaging, such as initiating a debugging session using encrypted messaging but requiring encrypted messages for each debugging command sent and debugging output received.

The debug console user may perform debugging procedures by entering plaintext commands (e.g., ASCII or Unicode) into the communication client window on the debug console 120, and these are encrypted into plaintext network packets and communicated through the debug server 125 to the device under test 130. Example commands are shown in Table 1 below:

TABLE 1

Command Examples

| Action | Command | Encrypted Network Packet |
| --- | --- | --- |
| Echo (for connection check) | /company | iuDmI+Mfa9kOxG2mXhIASS pfFk/0T7MoeZ8Lyp/ZhK4= |
| Request for the list of all commands | /company help | zAn2r7zDnZ/uvYLMTkz+2M EEP0+rKPPIFXspEbrCOxo= |
| Request to execute health check of the DUT | /company system_status | WSYV31YBs18yn4rC/m6dkW qX731xxokANebI9Gaqvo8= |
| Executes G3 of the system | /company system_G3 | g5r7MukYltm3Df7tVeRRLlJG FRm3W7vzMjSozm4zejs= |
| Press power button | /company system_pwr_buton | v9jQUB7IbLqsVc3YVIG4o8f Y9bS+15zEPjUkN9IA328= |
| Connect system to AC power | /company system_pwr_AC | SLkCAshC1iVZLejDWi7Mo/x FiflCqRYi+WYbpN5O3IM= |
| Execute system reset | /company system_reset | v9jQYPNVIGjD4o8YoqsVIbL bnEv8zbwOSoc3fmD c1KA= |

Using the debugging, a debug console user may type plaintext commands at the debug console 120, where the debug console 120 encrypts the plaintext command into the corresponding plaintext network packet shown in Table 1. The plaintext network packet is sent via communication infrastructure 105 to the debug server 125, which decrypts the plaintext network packet and sends a corresponding command to the device under test 130.

A client communication channel 135 may also be used to initiate a debugging process. The communication channel 135 may include a client IM client, a standalone debugging program, or other program operating at the customer site 115. To provide additional security or to provide specific debugging functionality, the communication channel 135 may be connected through the debugging console 120 to the debug server 125. In an embodiment, a customer sends a message to initiate a debugging process from the communication channel 135 through the communication infrastructure 105 to the debug console 120. For example, the communication channel may include an IM client, and the IM client may send a debug initiation command to a chatbot resident on the debug console. The debug console may initiate a debugging process or execute a debugging procedure, such as by sending a request for a memory read and dump through the debug server 125 to the device under test 130. The output of the debugging process or procedure may be communicated back through the debug server 125 to the debug console 120. Based on the output, the debug console 120 may send additional messages to perform additional debugging procedures, such as in response to particular failure states. The debug console 120 may also analyze the output and provide a debugging feedback message back to the communication channel 135, such as providing an indication of a successful diagnosis and repair of the device under test 130.

The use of an IM client provides various advantages. The plaintext IM client provides the ability to use an IM client that is compatible with a customer's current IM client, thereby avoiding the need for further network reconfiguration (e.g., a VPN). For example, a customer may use Skype or another plaintext IM client required by the customer's employer. This is in contrast with various non-plaintext protocols that require transmission of binary and other non-plaintext data, such as simple network management protocol (SNMP). Depending on the customer's IM client configuration, the use of an IM client may provide the ability to connect directly or through a public or private IM server.

For example, an IM client on the debug console 120 may connect directly (e.g., peer-to-peer connection) to an IM client on the debug server 125 without requiring a separate IM client server. The use of an IM client provide the ability to communicate in real-time, such as providing real-time communication between engineers or transmitting real-time debugging commands and real-time debugging outputs. The IM client provides the ability for more than one debugging engineer to execute various debugging steps. For example, a first engineer may execute a first portion of a debugging process, add a second debugging engineer with a different debugging expertise to the group chat to execute a second portion of a debugging process, and add or remove additional debugging engineers to the group chat as needed. The use of a plaintext IM client provides the ability to execute various debugging steps while communicating in plaintext with additional debugging engineers.

Figure 2:
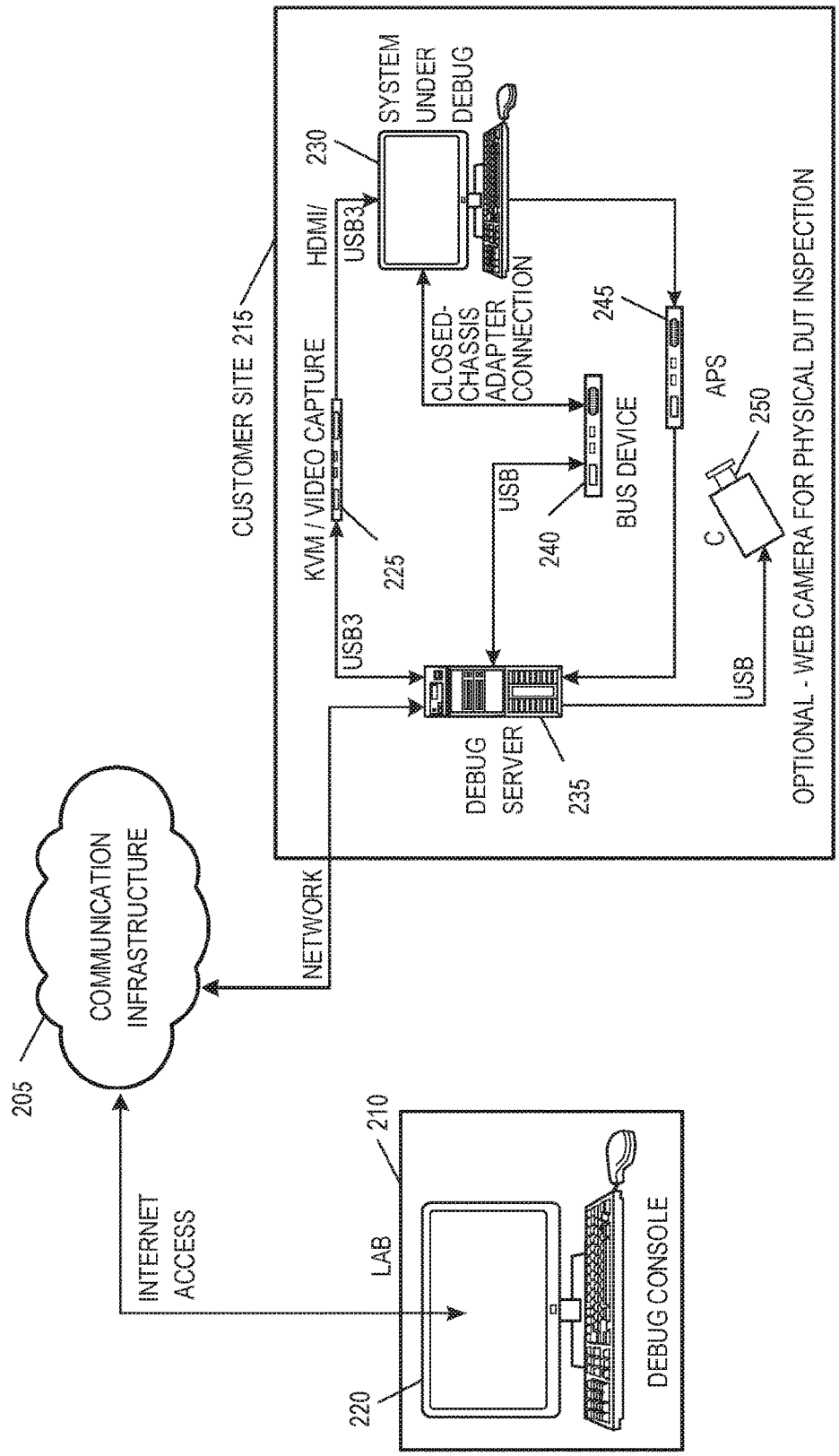
FIG. 2 is a block diagram of a multiple debugging device topology, in accordance with at least one embodiment.

FIG. 2 is a block diagram of a multiple debugging device topology 200, in accordance with at least one embodiment. Topology 200 includes a debug console 220, which may be located in a lab 210 of a service provider. Topology 200 includes a debug server 235 connected to the debug console 220 via communication infrastructure 205 (e.g., IM platform). The debug server 235 may be connected to the system under debug 230 (e.g., device under test), where the debug server 235 and device under debug 230 may be located at a customer site 215 (e.g. customer lab, business, or home). The debug server 235 includes the debugging software, the communication client, and the communication encryption keys, where the encryption keys may be pre-provisioned by the service provider. The debug console 220 runs at least the same tools as the debug server 235, thereby providing substantially the same debugging experience to a debug console user as if the user were physically interacting with the debug server 235. The debug console user interface (UI) and communication client may be integrated into a single program, or the UI may send commands to the communication client, such as using an API or other programmatic interface The customer site 215 may include a video-only relay or keyboard-video-mouse (KVM) relay 225 that communicates video or other user interface between the debug server 235 and the system under debug 230. The customer lab 215 may also include a bus device 240, which may include a platform-supported bus with a closed-chassis adapter. For example, the bus device 240 may include a back-side-bus (BSSB) within an enclosed chassis that uses an external closed-chassis adapter to connect specific connections to individual hardware ports. The debug server 235 may connect to the bus device 240 to avoid the need for a hardware-specific connection adapter. The customer lab 215 may include an automatic power supply 245 (APS) that uses a specific connection adapter to test for sleep mode, to test for battery power, or to test for AC power. The customer lab 215 may also include an optional camera 250 (e.g., internet protocol (IP) camera) for physical device-under-test (DUT) inspection.

Topology 200 may include a provisioning mechanism. The provisioning mechanism may be provided by the service provider before the deployment of the debug server 235 to provide data protection over the infrastructure 205. In an example, the provisioning mechanism may reduce or eliminate various network attacks, such as man-in-the-middle (MITM) attacks. During the provisioning state, keys for symmetric encryption (e.g., AES encryption, pycrypto Python to encrypt or decrypt messages, etc.) are created and stored in both the debug console 220 and debug server 235. Once provisioned, the communication over infrastructure 205 (or any other method) will be encrypted and secure, such as using one encryption key per message to reduce or eliminate unencrypted messages leaving either the debug console 220 or the debug server 235. Because encryption keys are used on a per-message basis, the number of encryption keys created may be selected based on an expected number of messages and based on an expected number of debug console 220 and debug server 235 devices, which may include creating and deploying billions of keys. This encryption key configuration reduces or eliminates the key exchange phase, and thereby prevents MITM attacks. The same encryption keys may be provisioned into more than one console allowing several debugging engineers physically located at different sites to debug the same device. This is achieved by adding debugging engineers and the debug server 235 into the same chat group. This provision of access by multiple engineers is not provided by present remote debugging protocols or standards.

Figure 3:
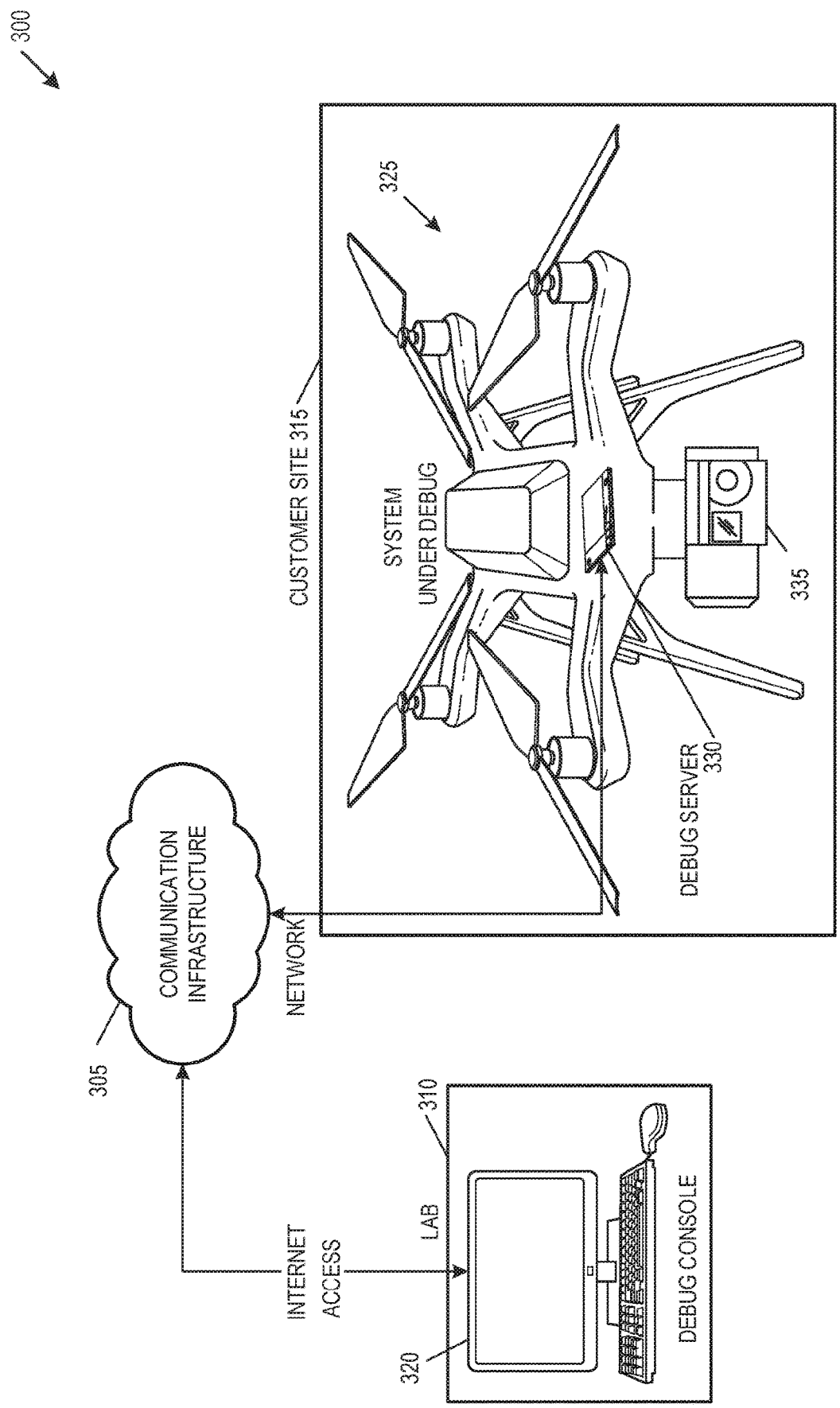
FIG. 3 is a block diagram of a networked device topology, in accordance with at least one embodiment.

FIG. 3 is a block diagram of a networked device topology 300, in accordance with at least one embodiment. Networked device topology 300 may communicate with a system under debug 325 at a customer site 315. The system under debug 325 may include the debug server 330. The system under debug 325 may include one or more remote data capture devices 335, such as an inertial measurement unit (IMU), remote camera, or other remote data capture device.

In various embodiments, various computing platforms are supported. The platforms may include networked device (IoT) platforms, where remote debugging management and control is possible on such platforms. In an embodiment, the platform include IoT devices 325 running a debug server 330 that allows a debugging engineer to interact with the IoT device 325 over the communication infrastructure 305. The platform may include an IoT debug server 330 that may be pre-provisioned with symmetric keys, the keys allowing a secure data exchange between the debug console 320 and the debug server 330.

Topology 300 further includes various solutions. In a software update example, an IoT system definition may be changed or upgraded. To change or upgrade the IoT system, a software deployment (e.g. software push) may be used to load new functionality or handle previous version bugs. In the software update example, topology 300 enables remote software update by pushing a binary message over the communication infrastructure 305. Similarly, topology 300 may address a platform that is not performing as expected, or that is not responding to inputs as expected. In an example, current customers are often required to run specific software while implementing complicated steps, which often results in the customers sending or bringing the IoT device to a service station to perform deep performance analysis. To reduce or minimize the costs associated with the in-person visits, customers may be asked to add the support engineer as a contact to the IoT communication client mechanism. In response, topology 300 enables the support engineer to perform all required analysis remotely then report back to the customer after analyzing and root causing the issue. This provides time savings for both the customer and the supplier (e.g., support engineer). Topology 300 also provides system monitoring. For example, in order to monitor a customer system, such as to measure its performance during long time durations, topology 300 may be used as a communication tunnel to send performance statistics and power consumption logs to a remote user for tracking and various other metrics.

Figure 4:
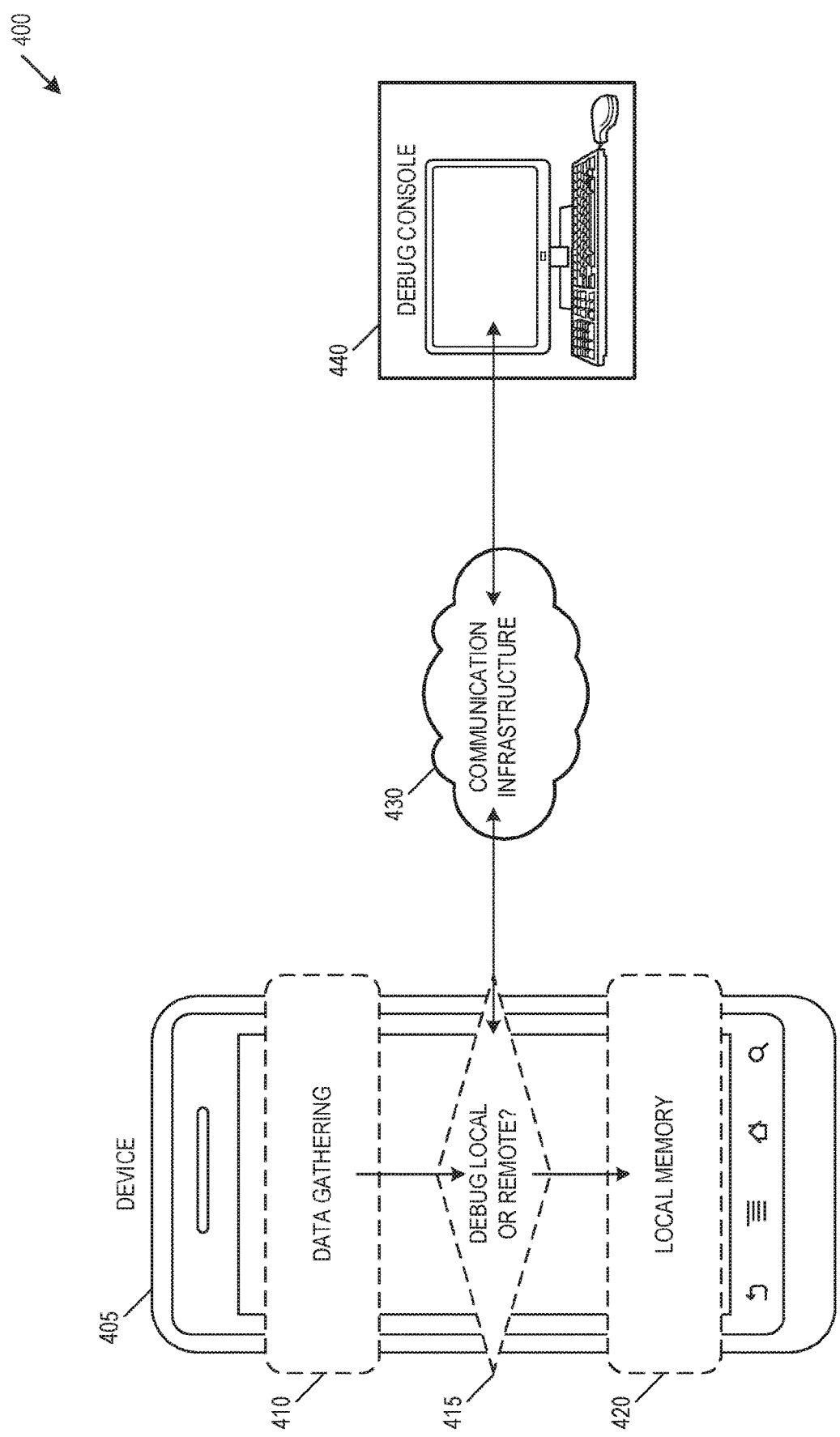
FIG. 4 is a block diagram of a memory debugging topology, in accordance with at least one embodiment.

FIG. 4 is a block diagram of a memory debugging topology 400, in accordance with at least one embodiment. Topology 400 includes a device 405, such as a smartphone, embedded device, IoT device, or other electronic device. In response to a debugging trigger, device 405 executes a data gathering 410. The debugging trigger may include a device malfunction (e.g., unhandled memory exception), a user-initiated memory dump, an unplanned restart, or another trigger. Data gathering 410 may include collecting device state data, which provides both the current state of the device (e.g., device memory states, connected device states) and provides data representing the states of the device that preceded or caused the debugging trigger. Data gathering 410 may include collecting device state data from a partial or full memory dump (e.g., pages saved into an internal volatile or non-volatile memory), available registers and buffers (e.g., last branch record hardware registers, firmware status), logged tracing data, and other device state data. Because many device types (e.g., embedded devices, IoT devices) do not provide debugging ports or do not provide easy access to debugging ports, the data gathering 410 is used to read and dump the relevant memory (e.g., memory core dump, register dump), logged tracing data (e.g., stack trace dump) and other device state information. The device 405 may include instrumentation software to provide the data gathering functionality, where the instrumentation software provides the ability to record and gather debugging data. The stack trace dump may include logged tracing data information about the execution of one or more executing programs, such as firmware, hardware, or software tracing data. In various examples, the stack trace dump data may include the instructions on the stack at the time of the fault, various high-level event logging data (e.g., program failure codes), various low-level software tracing (e.g., variable values), or other types of logging. The use of a memory core dump, a stack trace dump, and other device state information reduces or eliminates the need for debugging by writing and executing a script (e.g., small executable program) to gather data to reproduce the device system state.

Once the relevant device state data has been gathered, the device 405 may analyze the data to determine 415 whether debugging will be performed locally or remotely. The determination 415 may be based on the type of debugging trigger, based on an analysis of the contents of the gathered data to determine what portions of the data may be required to reproduce a device malfunction, based on the capability of the device 405 to perform local debugging, or based on other factors. When determination 415 selects local debugging, the data may be stored into local memory 420, such as saved into dynamic random access memory (DRAM), saved onto the device's hard disk drive (HDD), or otherwise stored on the device 405. In an embodiment, the data is stored into DRAM and a driver automatically collects the data from the DRAM based on an interrupt and stores the data on the HDD. The data may be used to perform debugging directly on the device 405, or may be accessed by a peripheral debugger directly connected to a port (e.g., debugging port) the device 405. The device 405 may perform some ongoing debugging on the device (e.g., error handling, event logging), however when the debugging trigger results in a program crash or system crash, the debugging may be interrupted or prevented. In contrast with ongoing debugging on the device 405, the data stored into local memory 420 represents the memory of the system state at the time of the debugging trigger, and the local debugging may recreate the system state history or operating instructions that caused the debugging trigger event. For example, the local debugging may extract the set of instructions on the stack at the time of the debugging trigger from the stack trace dump to recreate the operating instructions that led to the debugging trigger. In an embodiment, local debugging includes recreating the system memory state such that the debugger operates as if it were directly connected to a device to be debugged. Local debugging may be performed using a debugging integrated development environment (IDE), and emulator, or other debugging methodology. For example, the debugger may include a system emulator, and the local debugging may include recreating the system image.

When determination 415 selects remote debugging, the data may be sent through communication infrastructure 430 to debug console 440. In response to the debugging trigger, the device 405 may send all gathered data to the debug console 440, or may send a subset of the data that is sufficient to reproduce a device malfunction. The determination 415 may be in response to a debugging trigger received from the debug console 440, where the debugging trigger may be sent through communication infrastructure 430 using secure communication via existing communication infrastructure 205 (e.g., IM platform). In an embodiment, debug console 440 may receive an instruction to trigger debugging entered by a technician, and then create, encrypt, and send a debugging trigger based on the instruction. In response to the device 405 receiving the encrypted debugging trigger, device 405 may decrypt the debugging trigger, execute data gathering 410, encrypt the gathered data, and send the encrypted gathered data to the debug console 440. As with the device-based debugging described above, the debug console 440 may be used to recreate the system state history that caused the debugging trigger event. In an embodiment, the debug console 440 may recreate the system memory state such that the debugger operates as if it were directly connected to device 405, such as using a system emulator or debugging IDE.

Topology 400 provides a solution that enables improved local or remote debugging. In response to a device malfunction, topology 400 provides the ability to gather and analyze all available system information, where the system information is used to reduce the reproduction cycles required for root-cause analysis of the device malfunction. By providing debugging data representing the states of the device that preceded or caused the debugging trigger, this reduces or eliminates the need to develop scripts or instrumentation that is specific to the device 405 hardware and software configuration. This also eliminates the need to have a debugging engineer present at the location of the device 405, or to have the device 405 shipped to the supplier location. In an embodiment, topology 400 may be used to automate one or more of the debugging steps. For example, in response to a debugging trigger, device 405 may gather data 410, analyze data to determine 415 debugging location, and may save the data locally 420 or send the data to the debug console 440 for automated debugging.

Figure 5:
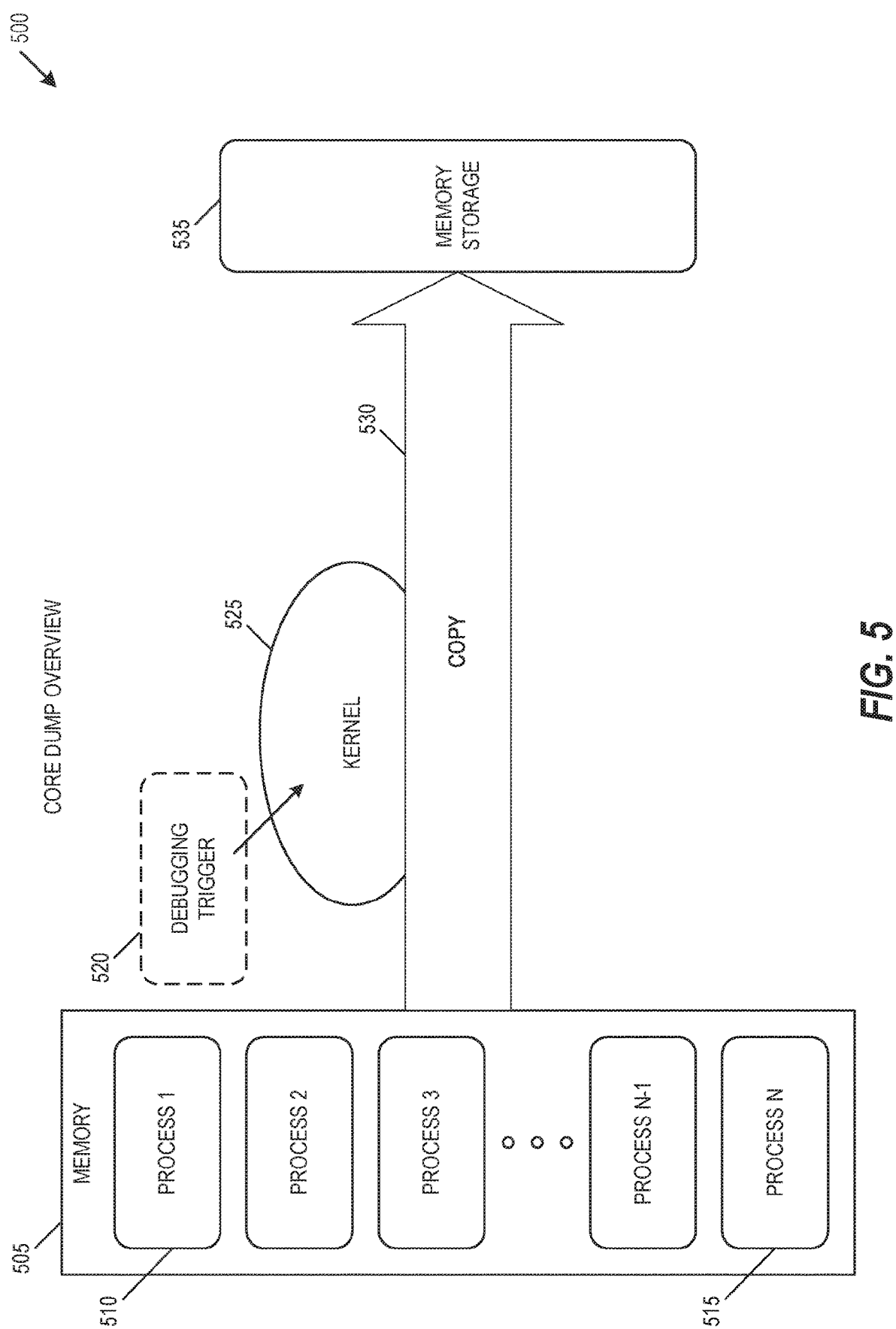
FIG. 5 is a block diagram of a core dump overview, in accordance with at least one embodiment.

FIG. 5 is a block diagram of a core dump overview 500, in accordance with at least one embodiment. In an embodiment, core dump overview 500 provides a description of procedures that may be used within the memory debugging topology 500 in response to a debugging trigger. In response to a debugging trigger 520, a device kernel 525 may collect one or more components of a device memory 505. Device memory 505 may include a first process 510 through an Nth process 515, and may include a secure embedded controller (not shown). Device kernel 525 may consolidate the memory 505 into a memory image, and may copy 530 the memory image to memory module 535. The memory copy 530 may be performed using one-way communication to reduce or eliminate new communication paths to the device kernel 525. The use of one-way communication may be used to preserve the integrity of the memory image, which may improve the ability of a debugger to recreate the device malfunction or other memory state.

Device kernel 525 may copy 530 the memory image to memory module 535. Memory module 535 may include a memory storage unit or a memory input/output device, such as dynamic random-access memory (DRAM), a USB memory location, direct memory access (DMA), a universal asynchronous receiver/transmitter (UART), a memory mapped input/output (MMIO), or other memory module. The MMIO may provide the ability to use a consistent address space to address memory devices and input/output devices. The memory module location may be selected based on the contents of the memory image, such as selecting a memory module location based on the tracing implementation. The copy 530 of the memory image to memory module 535 may include a secure copy mode. The secure copy mode may include identification and removal of secret data (e.g., encryption keys) from the memory image. The secure copy mode may also restrict access only to authenticated users. For example, the secure copy mode may identify and copy only a subset of the memory image to the memory module 535, or the secure copy mode may add security (e.g., encryption) to the memory image such that only an authorized user is able to access the memory image.

The memory image may be subsequently extracted, such as extraction to a further storage location or to a local or remote debugger. Because the memory image may be large, the memory image may be divided into memory image subcomponents to facilitate storage or transmission of the memory image. The memory image subcomponents may be generated based on a device architecture limitation, such as a device buffer size. The memory image subcomponents may be generated to be sent via multiple messages, where memory image subcomponents are embedded within the multiple messages. The memory image subcomponents may be generated based on the debugging architecture, such as dividing the memory image into pages of data to improve the ability of the debugger to recreate the device memory state.

The kernel 525 may provide additional debugging data to the memory image to provide various debugging features. In an embodiment, the kernel 525 may provide firmware state data. The firmware state data may enable the debugger to examine a series of prior firmware states (e.g., back-trace the firmware states) that were present prior to the debugging trigger 520, or may enable the debugger to recreate a full firmware memory state with debugging symbols at the time of the debugging trigger 520. For example, the debugging symbols may provide the ability to determine memory addresses and pass the memory into the appropriate software code memory addresses at the appropriate time and programmatic location (e.g., memory address) during software code execution. The additional information provided by the kernel 525 may be determined by the architecture of the device and by the debugger. For example, the kernel 525 may provide additional data based on the device processor architecture and the debugger environment (e.g., debugger processor architecture, debugger IDE). The kernel 525 may also enforce a secure copy mode to add security to the memory image, such as encrypting the memory so that only an authorized user is able to access the memory image.

Figure 6:
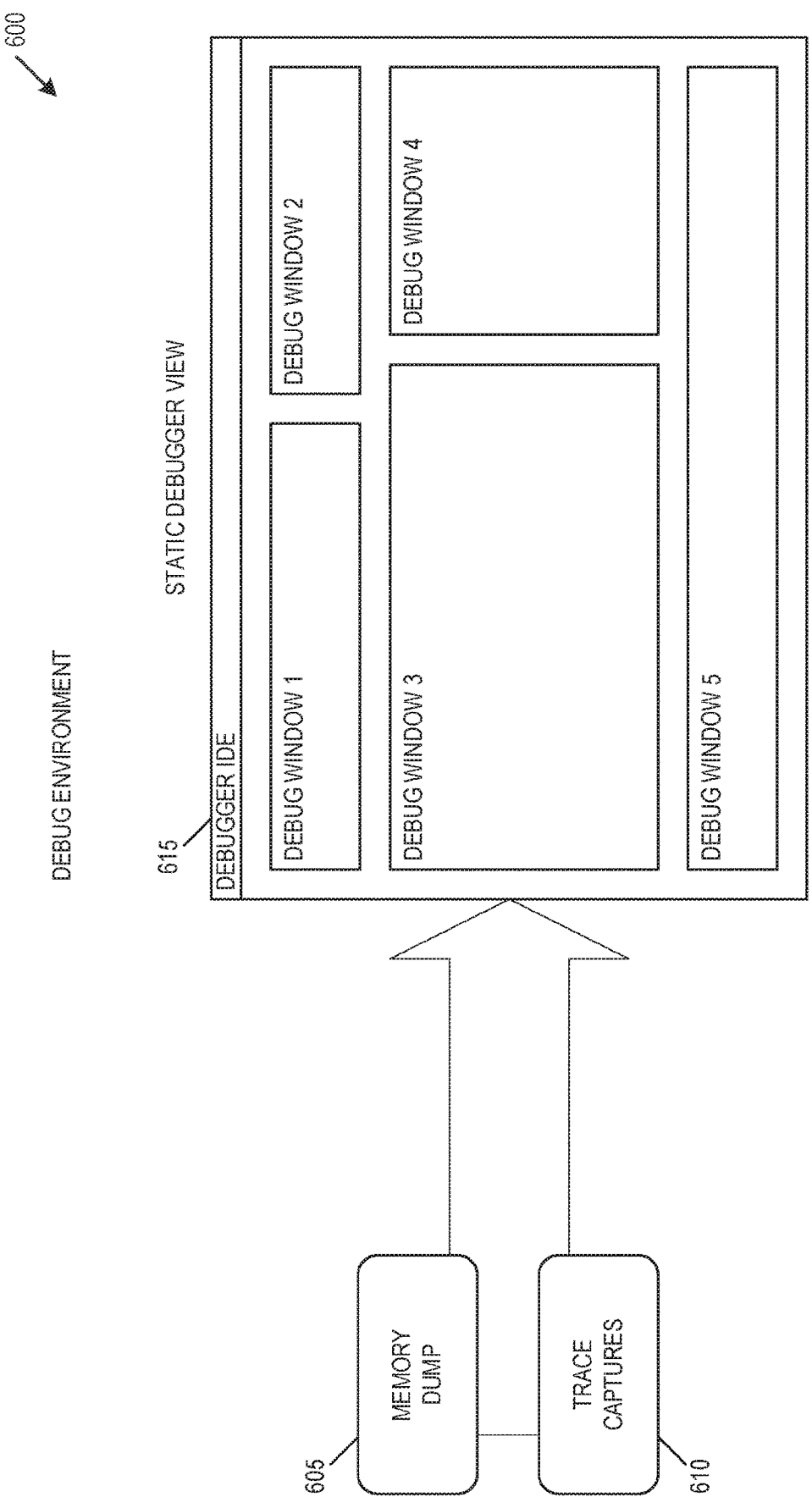
FIG. 6 is a block diagram of a debugging environment, in accordance with at least one embodiment.

FIG. 6 is a block diagram of a debugging environment 600, in accordance with at least one embodiment. Debugging environment 600 includes a memory dump 605 and trace captures 610, which are collected from an embedded device or IoT device in response to a debugging trigger. The memory dump 605 and trace captures 610 are communicated to a debugger, where they may be used within a debugger IDE 615. By using both memory dump 605 and trace captures 610, the debugger IDE 615 is able to recreate the device state and perform various debugging actions. This ability to recreate the device state is particularly useful for IoT and embedded devices, many of which do not provide debugging ports or do not provide easy access to debugging ports.

Figure 7:
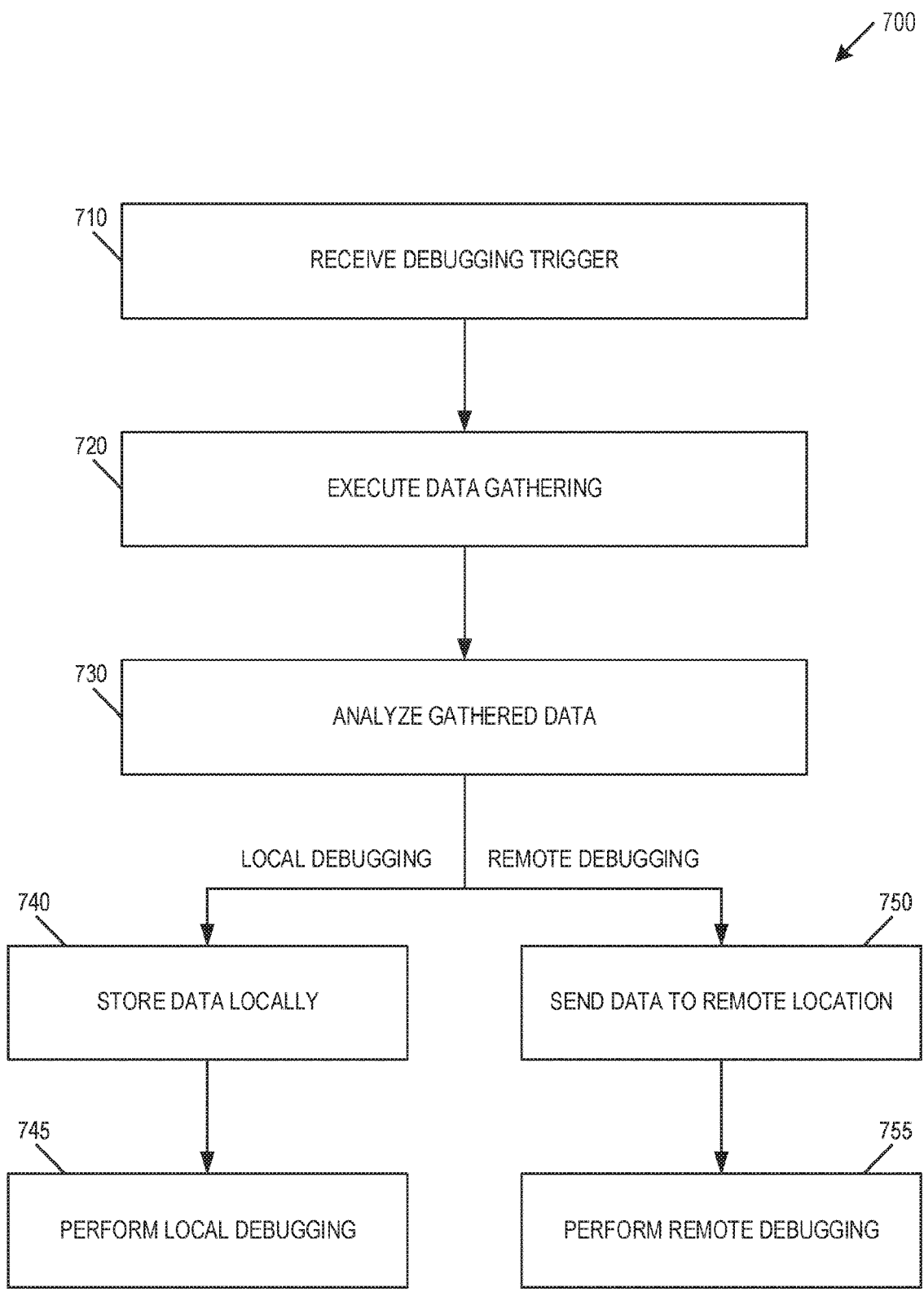
FIG. 7 is a block diagram illustrating a memory-based method 700 for remote, in accordance with at least one embodiment.

FIG. 7 is a block diagram illustrating a memory-based method 700 for remote debugging, in accordance with at least one embodiment. Method 700 may be executed on a processor of an electronic device, such as a smartphone, embedded device, an IoT device, or another electronic device. Method 700 includes receiving a debugging trigger 710, where the debugging trigger may include a device malfunction, a user-initiated memory dump, an unplanned restart, or another trigger. In response to receiving the debugging trigger 710, the device executes data gathering 720. Data gathering 720 may include collecting device state data from a partial or full memory dump, available registers and buffers, a stack trace dump, and other device state data.

After executing data gathering 720, the device may analyze the data 730. Analysis 730 may determine whether debugging will be performed locally or remotely, and may be based on the type of debugging trigger, based on an analysis of the contents of the gathered data to determine what portions of the data may be required to reproduce a device malfunction, based on the capability of the device to perform local debugging, or based on other factors.

When analysis 730 selects local debugging, the data may be stored locally 740, such as saved into DRAM, saved onto the device HDD, or otherwise stored on the device. The stored data may be used to perform local debugging 745 directly on the device, or may be accessed by a peripheral debugger directly connected to a port the device. In an embodiment, local debugging 745 includes recreating the system memory state such that the debugger operates as if it were directly connected to a device to be debugged.

When analysis 730 selects remote debugging, the data may be sent to a remote location 750, such as to a remote debug console. The selection of remote debugging may be in response to a debugging trigger received from the remote debug console, where the debugging trigger may be sent using secure communication via existing communication infrastructure, such as using debugging communication method 800 described below. Once the sent data is received at the remote location, the data may be used to perform remote debugging 755. In an embodiment, the remote debug console may recreate the system memory state such that the remote debug console operates as if it were directly connected to device, such as using a system emulator or debugging IDE.

Figure 8:
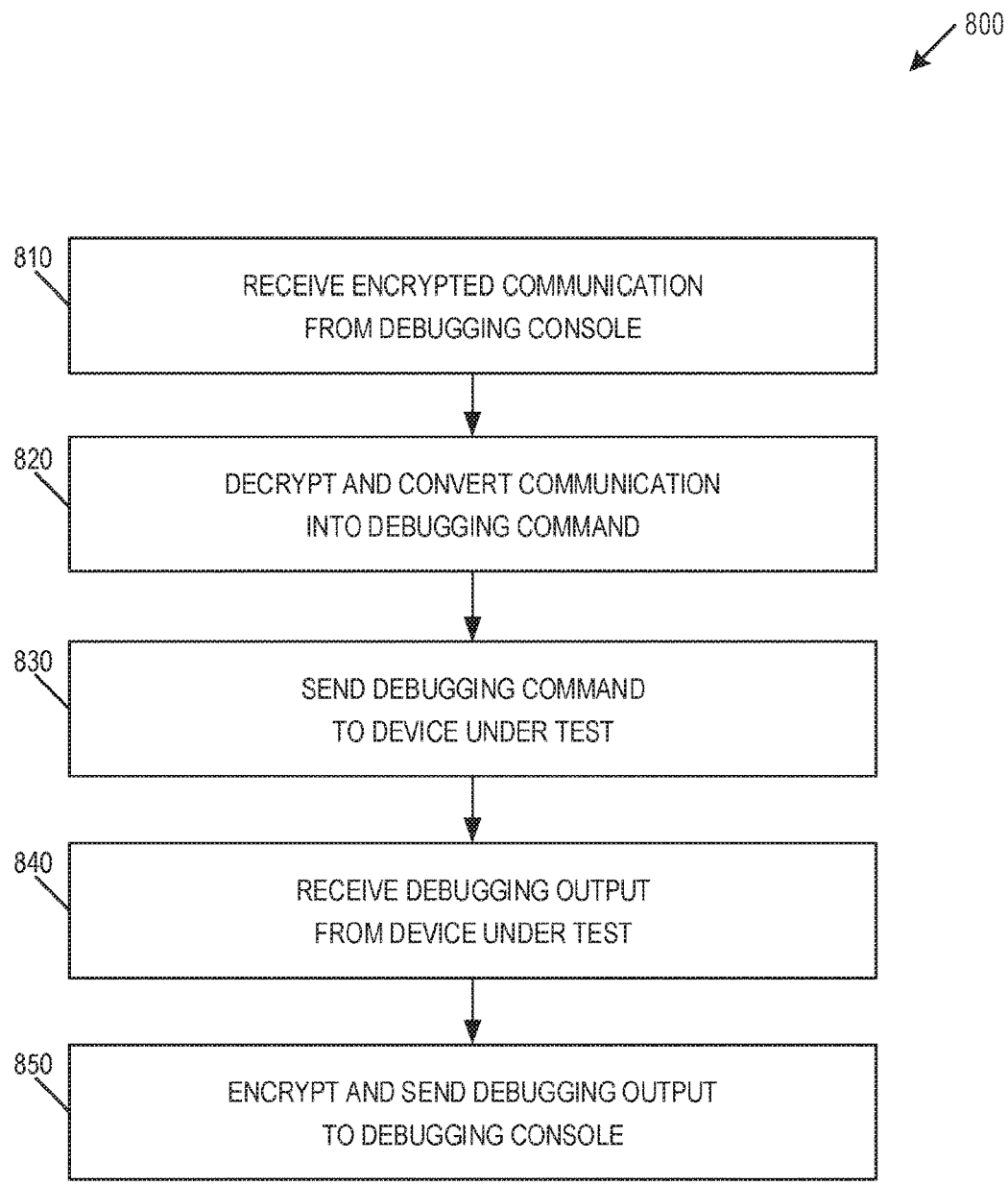
FIG. 8 is a block diagram illustrating a debugging communication 800 for remote, in accordance with at least one embodiment.

FIG. 8 is a block diagram illustrating a debugging communication method 800 for remote debugging, in accordance with at least one embodiment. Debugging communication method 800 may be used independent of method 700, or may be combined with method 700 as described above. Method 800 includes receiving 810 an encrypted remote command from a remote debug console device at a debug server. Method 800 includes decrypting 820 the encrypted remote command into a decrypted remote command. Method 800 includes sending 830 the decrypted remote command to a device under test. Method 800 includes receiving 840 a debugging output from the device under test. Method 800 includes encrypting 850 the debugging output into an encrypted debugging output and sending the encrypted debugging output to the remote debug console device.

Figure 9:
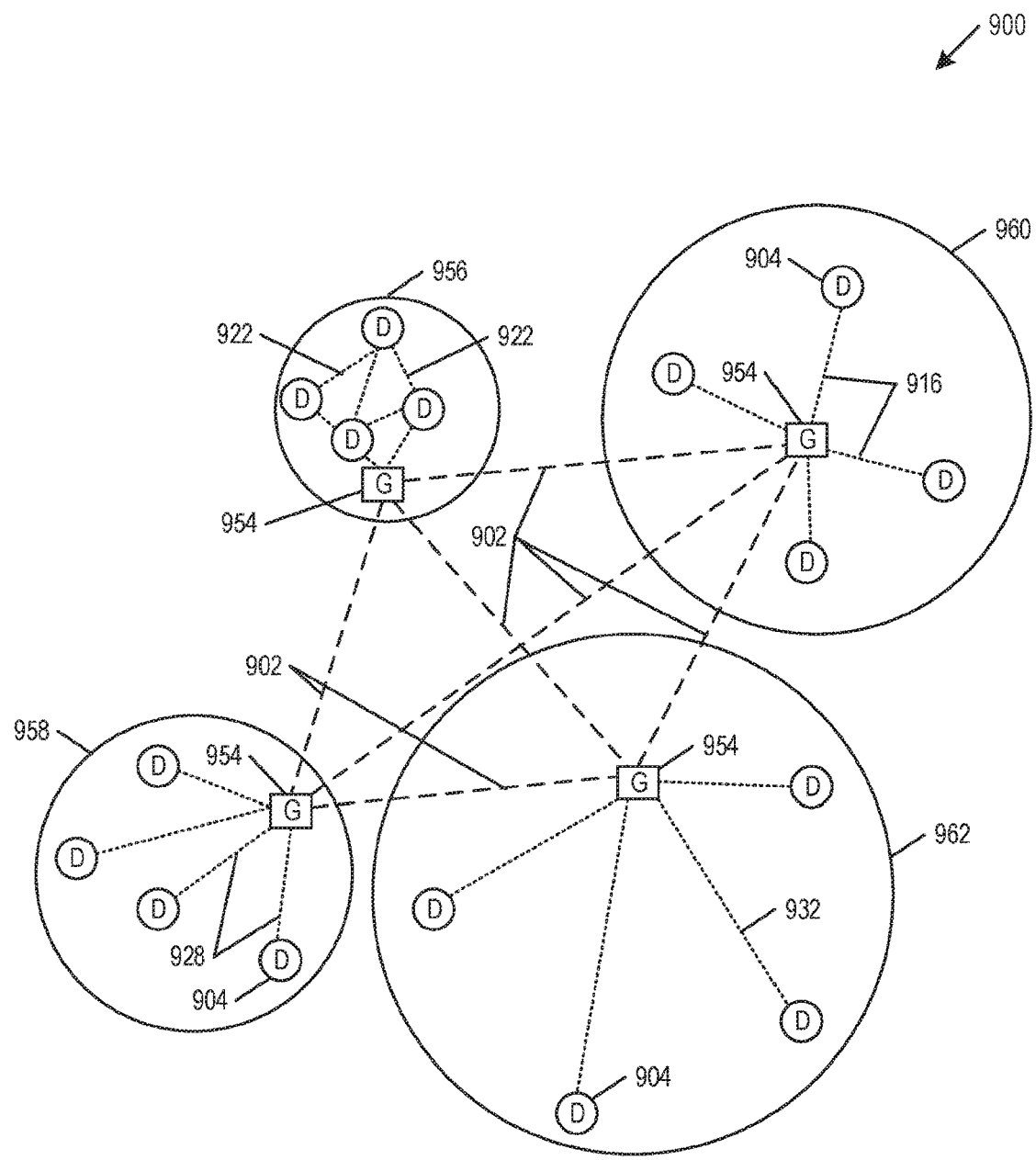
FIG. 9 illustrates a domain topology for respective internet-of-things (IoT) networks coupled through links to respective gateways, in accordance with at least one embodiment.

FIG. 9 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 10:
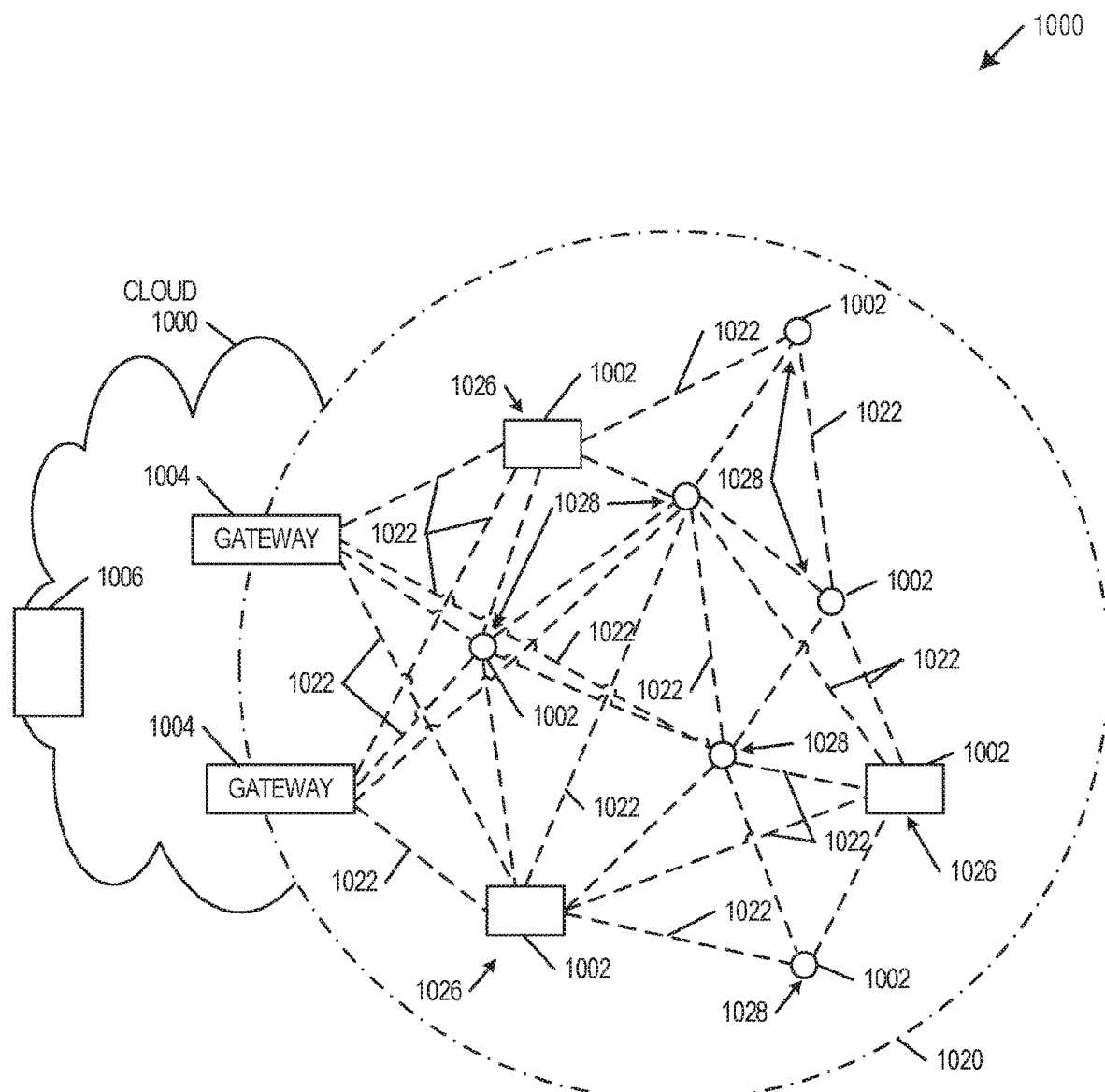
FIG. 10 illustrates a cloud computing network in communication with a mesh network of IoT devices operating as a fog device at the edge of the cloud computing network, in accordance with at least one embodiment.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 9 and 10, present a number of new challenges in a heterogeneous network of connectivity comprising a combination of wired and wireless technologies.

FIG. 9 specifically provides a simplified drawing of a domain topology that may be used for a number of internet-of-things (IoT) networks comprising IoT devices 904, with the IoT networks 956, 958, 960, 962, coupled through backbone links 902 to respective gateways 954. For example, a number of IoT devices 904 may communicate with a gateway 954, and with each other through the gateway 954. To simplify the drawing, not every IoT device 904, or communications link (e.g., link 916, 922, 928, or 932) is labeled. The backbone links 902 may include any number of wired or wireless technologies, including optical networks, and may be part of a local area network (LAN), a wide area network (WAN), or the Internet. Additionally, such communication links facilitate optical signal paths among both IoT devices 904 and gateways 954, including the use of MUXing/deMUXing components that facilitate interconnection of the various devices.

The network topology may include any number of types of IoT networks, such as a mesh network provided with the network 956 using Bluetooth low energy (BLE) links 922. Other types of IoT networks that may be present include a wireless local area network (WLAN) network 958 used to communicate with IoT devices 904 through IEEE 802.11 (Wi-Fi®) links 928, a cellular network 960 used to communicate with IoT devices 904 through an LTE/LTE-A (4G) or 5G cellular network, and a low-power wide area (LPWA) network 962, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 904, such as over the backbone links 902, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 956, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 958, for instance, may use systems that perform standards conversion to provide multi-standard connectivity, enabling IoT devices 904 using different protocols to communicate. Further systems may provide seamless interconnectivity across a multi-standard infrastructure comprising visible Internet resources and hidden Internet resources.

Communications in the cellular network 960, for instance, may be enhanced by systems that offload data, extend communications to more remote devices, or both. The LPWA network 962 may include systems that perform non-Internet protocol (IP) to IP interconnections, addressing, and routing. Further, each of the IoT devices 904 may include the appropriate transceiver for wide area communications with that device. Further, each IoT device 904 may include other transceivers for communications using additional protocols and frequencies. This is discussed further with respect to the communication environment and hardware of an IoT processing device depicted in FIGS. 12 and 13.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 10 below.

FIG. 10 illustrates a cloud computing network in communication with a mesh network of IoT devices (devices 1002) operating as a fog device at the edge of the cloud computing network. The mesh network of IoT devices may be termed a fog 1020, operating at the edge of the cloud 1000. To simplify the diagram, not every IoT device 1002 is labeled.

The fog 1020 may be considered to be a massively interconnected network wherein a number of IoT devices 1002 are in communications with each other, for example, by radio links 1022. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 1002 are shown in this example, gateways 1004, data aggregators 1026, and sensors 1028, although any combinations of IoT devices 1002 and functionality may be used. The gateways 1004 may be edge devices that provide communications between the cloud 1000 and the fog 1020, and may also provide the backend process function for data obtained from sensors 1028, such as motion data, flow data, temperature data, and the like. The data aggregators 1026 may collect data from any number of the sensors 1028, and perform the back end processing function for the analysis. The results, raw data, or both may be passed along to the cloud 1000 through the gateways 1004. The sensors 1028 may be full IoT devices 1002, for example, capable of both collecting data and processing the data. In some cases, the sensors 1028 may be more limited in functionality, for example, collecting the data and allowing the data aggregators 1026 or gateways 1004 to process the data.

Communications from any IoT device 1002 may be passed along a convenient path (e.g., a most convenient path) between any of the IoT devices 1002 to reach the gateways 1004. In these networks, the number of interconnections provide substantial redundancy, allowing communications to be maintained, even with the loss of a number of IoT devices 1002. Further, the use of a mesh network may allow IoT devices 1002 that are very low power or located at a distance from infrastructure to be used, as the range to connect to another IoT device 1002 may be much less than the range to connect to the gateways 1004.

The fog 1020 provided from these IoT devices 1002 may be presented to devices in the cloud 1000, such as a server 1006, as a single device located at the edge of the cloud 1000, e.g., a fog device. In this example, the alerts coming from the fog device may be sent without being identified as coming from a specific IoT device 1002 within the fog 1020. In this fashion, the fog 1020 may be considered a distributed platform that provides computing and storage resources to perform processing or data-intensive tasks such as data analytics, data aggregation, and machine-learning, among others.

In some examples, the IoT devices 1002 may be configured using an imperative programming style, e.g., with each IoT device 1002 having a specific function and communication partners. However, the IoT devices 1002 forming the fog device may be configured in a declarative programming style, allowing the IoT devices 1002 to reconfigure their operations and communications, such as to determine needed resources in response to conditions, queries, and device failures. As an example, a query from a user located at a server 1006 about the operations of a subset of equipment monitored by the IoT devices 1002 may result in the fog 1020 device selecting the IoT devices 1002, such as particular sensors 1028, needed to answer the query. The data from these sensors 1028 may then be aggregated and analyzed by any combination of the sensors 1028, data aggregators 1026, or gateways 1004, before being sent on by the fog 1020 device to the server 1006 to answer the query. In this example, IoT devices 1002 in the fog 1020 may select the sensors 1028 used based on the query, such as adding data from flow sensors or temperature sensors. Further, if some of the IoT devices 1002 are not operational, other IoT devices 1002 in the fog 1020 device may provide analogous data, if available.

In other examples, the operations and functionality described above with reference to FIGS. 1 to 8 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 11:
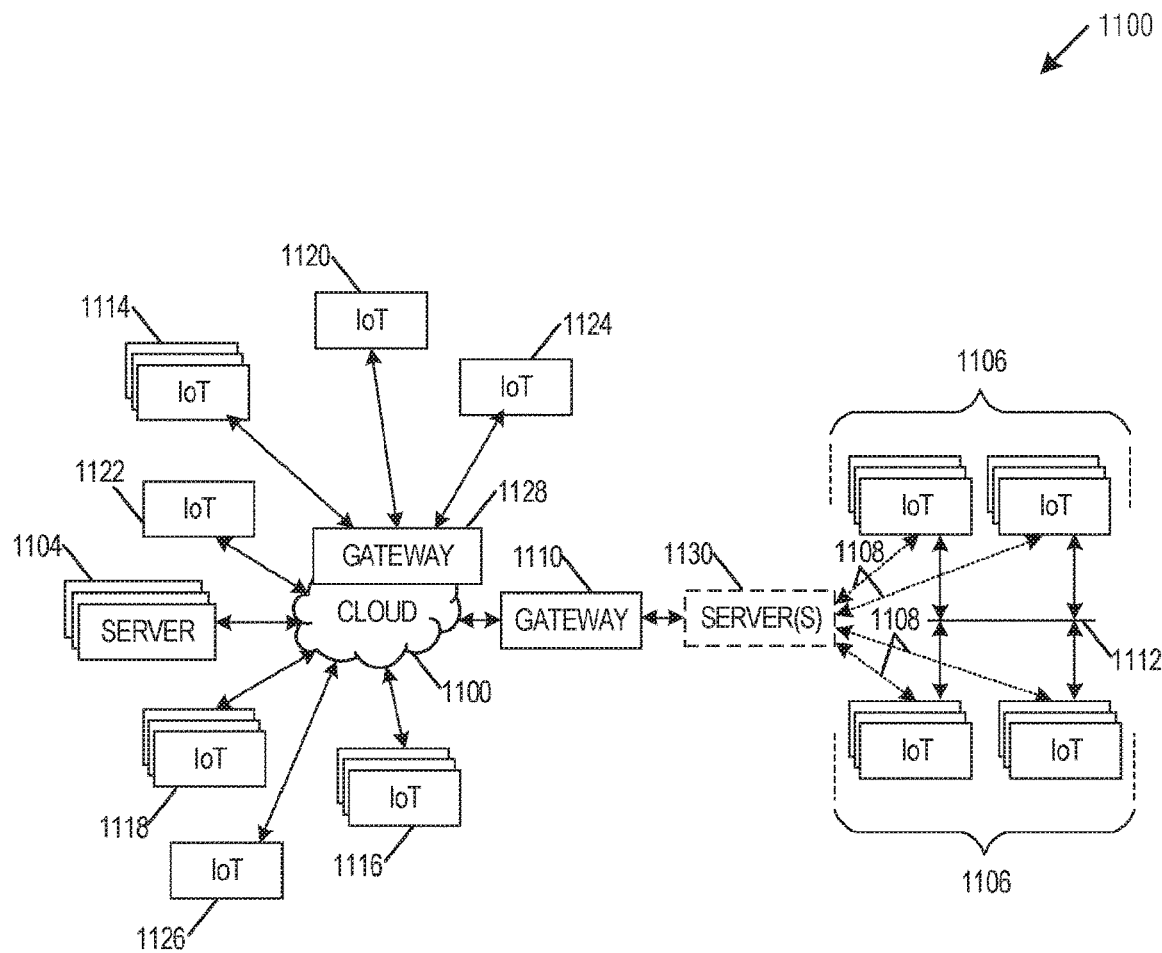
FIG. 11 illustrates a block diagram of a network illustrating communications among a number of IoT devices, in accordance with at least one embodiment.

FIG. 11 illustrates a drawing of a cloud computing network, or cloud 1100, in communication with a number of Internet of Things (IoT) devices. The cloud 1100 may represent the Internet, or may be a local area network (LAN), or a wide area network (WAN), such as a proprietary network for a company. The IoT devices may include any number of different types of devices, grouped in various combinations. For example, a traffic control group 1106 may include IoT devices along streets in a city. These IoT devices may include stoplights, traffic flow monitors, cameras, weather sensors, and the like. The traffic control group 1106, or other subgroups, may be in communication with the cloud 1100 through wired or wireless links 1108, such as LPWA links, optical links, and the like. Further, a wired or wireless sub-network 1112 may allow the IoT devices to communicate with each other, such as through a local area network, a wireless local area network, and the like. The IoT devices may use another device, such as a gateway 1110 or 1128 to communicate with remote locations such as the cloud 1100; the IoT devices may also use one or more servers 1130 to facilitate communication with the cloud 1100 or with the gateway 1110. For example, the one or more servers 1130 may operate as an intermediate network node to support a local edge cloud or fog implementation among a local area network. Further, the gateway 1128 that is depicted may operate in a cloud-to-gateway-to-many edge devices configuration, such as with the various IoT devices 1114, 1120, 1124 being constrained or dynamic to an assignment and use of resources in the cloud 1100.

Other example groups of IoT devices may include remote weather stations 1114, local information terminals 1116, alarm systems 1118, automated teller machines 1120, alarm panels 1122, or moving vehicles, such as emergency vehicles 1124 or other vehicles 1126, among many others. Each of these IoT devices may be in communication with other IoT devices, with servers 1104, with another IoT fog device or system (not shown, but depicted in FIG. 10), or a combination therein. The groups of IoT devices may be deployed in various residential, commercial, and industrial settings (including in private or public environments).

As can be seen from FIG. 11, a large number of IoT devices may be communicating through the cloud 1100. This may allow different IoT devices to request or provide information to other devices autonomously. For example, a group of IoT devices (e.g., the traffic control group 1106) may request a current weather forecast from a group of remote weather stations 1114, which may provide the forecast without human intervention. Further, an emergency vehicle 1124 may be alerted by an automated teller machine 1120 that a burglary is in progress. As the emergency vehicle 1124 proceeds towards the automated teller machine 1120, it may access the traffic control group 1106 to request clearance to the location, for example, by lights turning red to block cross traffic at an intersection in sufficient time for the emergency vehicle 1124 to have unimpeded access to the intersection.

Clusters of IoT devices, such as the remote weather stations 1114 or the traffic control group 1106, may be equipped to communicate with other IoT devices as well as with the cloud 1100. This may allow the IoT devices to form an ad-hoc network between the devices, allowing them to function as a single device, which may be termed a fog device or system (e.g., as described above with reference to FIG. 10).

Figure 12:
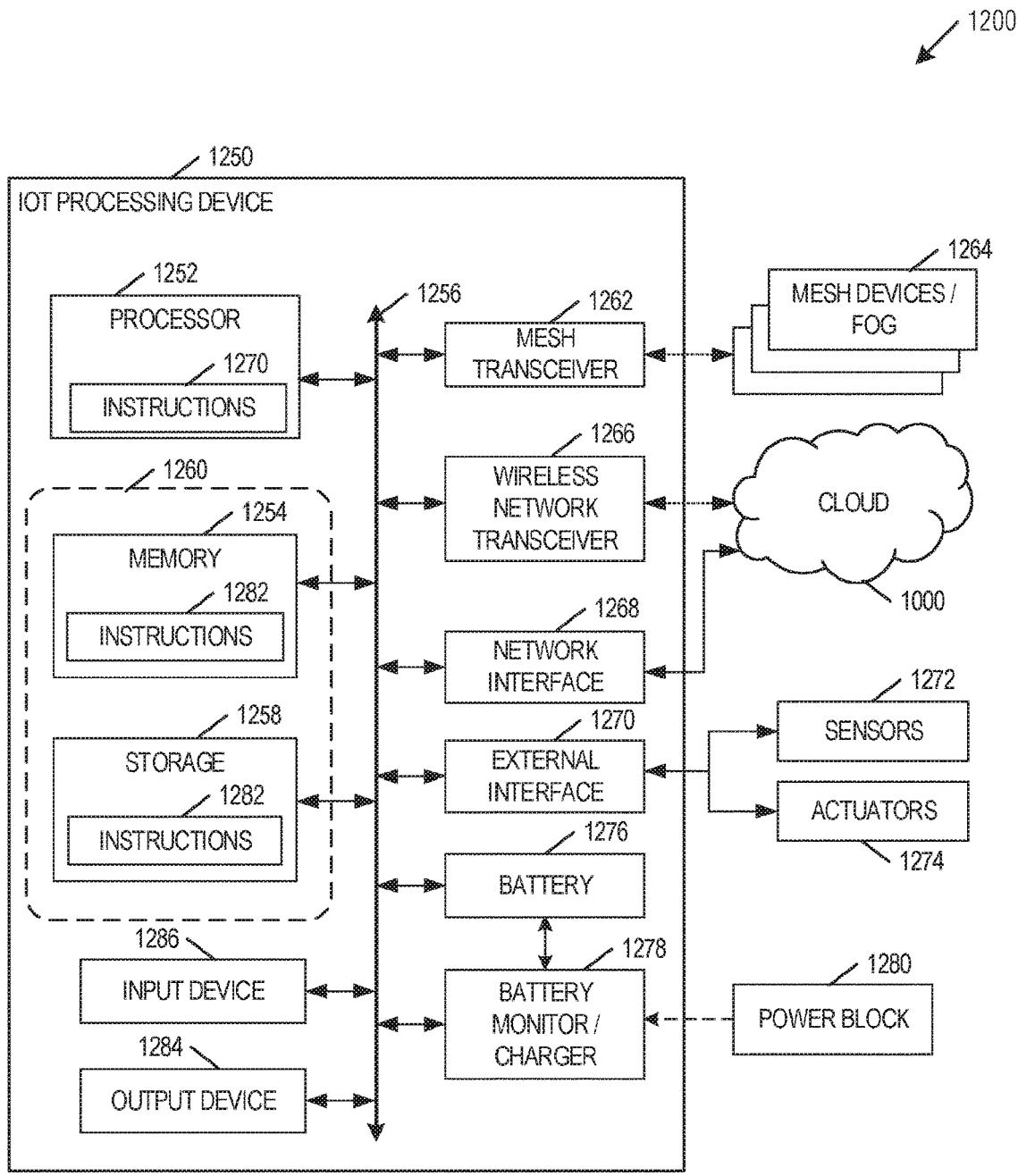
FIG. 12 illustrates a block diagram for an example IoT processing system architecture upon which any one or more of the techniques (e.g., operations, processes, methods, and methodologies) discussed herein may be performed, in accordance with at least one embodiment.

FIG. 12 is a block diagram of an example of components that may be present in an IoT device 1250 for implementing the techniques described herein. The IoT device 1250 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1250, or as components otherwise incorporated within a chassis of a larger system. Additionally, the block diagram of FIG. 12 is intended to depict a high-level view of components of the IoT device 1250. However, some of the components shown may be omitted, additional components may be present, and different arrangement of the components shown may occur in other implementations.

The IoT device 1250 may include a processor 1252, which may be a microprocessor, a multi-core processor, a multithreaded processor, an ultra-low voltage processor, an embedded processor, or other known processing element. The processor 1252 may be a part of a system on a chip (SoC) in which the processor 1252 and other components are formed into a single integrated circuit, or a single package, such as the Edison™ or Galileo™ SoC boards from Intel. As an example, the processor 1252 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1252 may communicate with a system memory 1254 over an interconnect 1256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example the storage 1258 may be implemented via a solid state disk drive (SSDD). Other devices that may be used for the storage 1258 include flash memory cards, such as SD cards, microSD cards, xD picture cards, and the like, and USB flash drives. In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in a SoC based system. Other bus systems may be included, such as an I2C interface, an SPI interface, point to point interfaces, and a power bus, among others.

The interconnect 1256 may couple the processor 1252 to a mesh transceiver 1262, for communications with other mesh devices 1264. The mesh transceiver 1262 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1264. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1262 may communicate using multiple standards or radios for communications at different range. For example, the IoT device 1250 may communicate with close devices, e.g., within about 10 meters, using a local transceiver based on BLE, or another low power radio, to save power. More distant mesh devices 1264, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1266 may be included to communicate with devices or services in the cloud 1200 via local or wide area network protocols. The wireless network transceiver 1266 may be a LPWA transceiver that follows the IEEE 802.15.4, or IEEE 802.15.4g standards, among others. The IoT device 1250 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1262 and wireless network transceiver 1266, as described herein. For example, the radio transceivers 1262 and 1266 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1262 and 1266 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include, e.g., a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1266, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1268 may be included to provide a wired communication to the cloud 1200 or to other devices, such as the mesh devices 1264. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to allow connect to a second network, for example, a NIC 1268 providing communications to the cloud over Ethernet, and a second NIC 1268 providing communications to other devices over another type of network.

The interconnect 1256 may couple the processor 1252 to an external interface 1270 that is used to connect external devices or subsystems. The external devices may include sensors 1272, such as accelerometers, level sensors, flow sensors, optical light sensors, camera sensors, temperature sensors, a global positioning system (GPS) sensors, pressure sensors, barometric pressure sensors, and the like. The external interface 1270 further may be used to connect the IoT device 1250 to actuators 1274, such as power switches, valve actuators, an audible sound generator, a visual warning device, and the like.

In some optional examples, various input/output (I/O) devices may be present within, or connected to, the IoT device 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1250.

A battery 1276 may power the IoT device 1250, although in examples in which the IoT device 1250 is mounted in a fixed location, it may have a power supply coupled to an electrical grid. The battery 1276 may be a lithium ion battery, or a metal-air battery, such as a zinc-air battery, an aluminum-air battery, a lithium-air battery, and the like.

A battery monitor/charger 1278 may be included in the IoT device 1250 to track the state of charge (SoCh) of the battery 1276. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1278 may communicate the information on the battery 1276 to the processor 1252 over the interconnect 1256. The battery monitor/charger 1278 may also include an analog-to-digital (ADC) convertor that allows the processor 1252 to directly monitor the voltage of the battery 1276 or the current flow from the battery 1276. The battery parameters may be used to determine actions that the IoT device 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the IoT device 1250. A wireless battery charging circuit, such as an LTC4020 chip from Linear Technologies of Milpitas, Calif., among others, may be included in the battery monitor/charger 1278. The specific charging circuits chosen depend on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine readable medium 1260 including code to direct the processor 1252 to perform electronic operations in the IoT device 1250. The processor 1252 may access the non-transitory, machine readable medium 1260 over the interconnect 1256. For instance, the non-transitory, machine readable medium 1260 may be embodied by devices described for the storage 1258 of FIG. 13 or may include specific storage units such as optical disks, flash drives, or any number of other hardware devices. The non-transitory, machine readable medium 1260 may include instructions to direct the processor 1252 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device debugging system comprising: a processor to: implement an IM client and receive a chat message; configure a debugging trigger based on the chat message; and initiate a debug process, in response to the debugging trigger, including gathering device state data from a device in response to a debugging trigger, the device state data including a stack trace dump and a memory core dump; a memory to store the device state data within a memory image, the memory image being an input to a debugger to execute a debug process.

In Example 2, the subject matter of Example 1 optionally includes wherein the device further includes the debugger to execute the debugging process based on the memory image.

In Example 3, the subject matter of any one or more of Examples 1-2 optionally include wherein the processor is to transmit the memory image via the IM client to a remote debugger to execute the debugging process based on the memory image.

In Example 4, the subject matter of any one or more of Examples 1-3 optionally include wherein data transferred via the IM client is encoded in at least one of ASCII or Unicode.

In Example 5, the subject matter of any one or more of Examples 1-4 optionally include wherein the device includes at least one of an embedded device and an internet of things (IoT) device.

In Example 6, the subject matter of any one or more of Examples 1-5 optionally include wherein the memory core dump includes at least one of a device memory state and a device register state.

In Example 7, the subject matter of any one or more of Examples 1-6 optionally include wherein the debugger executing the debugging process recreates a device state based on the memory image.

In Example 8, the subject matter of any one or more of Examples 1-7 optionally include wherein the stack trace dump includes a plurality of instructions on a device stack.

In Example 9, the subject matter of Example 8 optionally includes wherein the debugger executing the debugging process includes recreating a plurality of operating instructions that led to the debugging trigger.

In Example 10, the subject matter of any one or more of Examples 1-9 optionally include wherein the debugging trigger includes at least one of a device malfunction, a user-initiated trigger, and an unplanned restart.

In Example 11, the subject matter of any one or more of Examples 1-10 optionally include the processor further to analyze the device state data to determine whether to execute the debugging process locally or remotely.

In Example 12, the subject matter of any one or more of Examples 1-11 optionally include a network interface device.

In Example 13, the subject matter of Example 12 optionally includes wherein: the network interface device sends the memory image to a remote device; and the remote device includes the remote debugger to execute the debugging process.

In Example 14, the subject matter of any one or more of Examples 12-13 optionally include wherein the network interface device receives the debugging trigger.

In Example 15, the subject matter of Example 14 optionally includes wherein: the network interface device further receives an encrypted remote command; and the processor further decrypts the encrypted remote command to generate the debugging trigger.

In Example 16, the subject matter of Example 15 optionally includes wherein: the memory is further to store a plurality of encryption keys; and the processor decrypts the encrypted remote command based on the plurality of encryption keys.

In Example 17, the subject matter of Example 16 optionally includes wherein the processor further encrypts the gathered data within the memory image based on the plurality of encryption keys.

In Example 18, the subject matter of any one or more of Examples 1-17 optionally include wherein the memory and the debugger are resident on a debugged device.

In Example 19, the subject matter of Example 18 optionally includes wherein the memory to store the gathered data within a memory image includes the memory to store the memory image within at least one of a dynamic random access memory (DRAM) and a device hard disk drive (HDD).

Example 20 is a device debugging method comprising: implementing an IM client and receive a chat message; configuring a debugging trigger based on the chat message; initiating a debug process, in response to the debugging trigger, including gathering device state data from a device in response to a debugging trigger, the device state data including a stack trace dump and a memory core dump; storing the device state data within a memory image, the memory image being an input to a debugger to execute a debug process.

In Example 21, the subject matter of Example 20 optionally includes wherein the device further includes the debugger to execute the debugging process based on the memory image.

In Example 22, the subject matter of any one or more of Examples 20-21 optionally include wherein the processor is to transmit the memory image via the IM client to a remote debugger to execute the debugging process based on the memory image.

In Example 23, the subject matter of any one or more of Examples 20-22 optionally include wherein data transferred via the IM client is encoded in at least one of ASCII or Unicode.

In Example 24, the subject matter of any one or more of Examples 20-23 optionally include wherein the device includes at least one of an embedded device and an internet of things (IoT) device.

In Example 25, the subject matter of any one or more of Examples 20-24 optionally include wherein the memory core dump further includes at least one of a device memory state and a device register state.

In Example 26, the subject matter of any one or more of Examples 20-25 optionally include wherein executing the debugging process recreates a device state based on the memory image.

In Example 27, the subject matter of any one or more of Examples 20-26 optionally include wherein the stack trace dump includes a plurality of instructions on a device stack.

In Example 28, the subject matter of Example 27 optionally includes wherein the debugger executing the debugging process includes recreating a plurality of operating instructions that led to the debugging trigger.

In Example 29, the subject matter of any one or more of Examples 20-28 optionally include wherein the debugging trigger includes at least one of a device malfunction, a user-initiated trigger, and an unplanned restart.

In Example 30, the subject matter of any one or more of Examples 20-29 optionally include analyzing the device state data to determine whether to execute the debugging process locally or remotely.

In Example 31, the subject matter of any one or more of Examples 20-30 optionally include sending the memory image to a remote device to execute the debugging process.

In Example 32, the subject matter of Example 31 optionally includes receiving the debugging trigger at the device from the remote device.

In Example 33, the subject matter of Example 32 optionally includes wherein receiving the debugging trigger at the device from the remote device includes: receiving an encrypted remote command from the remote device; and decrypting the encrypted remote command to generate the debugging trigger.

In Example 34, the subject matter of Example 33 optionally includes wherein decrypting the encrypted remote command includes decrypting the encrypted remote command based on a plurality of encryption keys stored on the device.

In Example 35, the subject matter of Example 34 optionally includes wherein storing the gathered data within the memory image includes encrypting the gathered data within the memory image based on the plurality of encryption keys stored on the device.

In Example 36, the subject matter of any one or more of Examples 20-35 optionally include wherein: storing the gathered data within the memory image includes storing the memory image on the device; and executing the debugging process includes executing a debugging local process on the device.

In Example 37, the subject matter of Example 36 optionally includes wherein storing the memory image on the device includes storing the memory image within at least one of a dynamic random access memory (DRAM) and a device hard disk drive (HDD).

Example 38 is at least one machine-readable medium including instructions, which when executed by a computing system, cause the computing system to perform any of the methods of Examples 20-37.

Example 39 is an apparatus comprising means for performing any of the methods of Examples 20-37.

Example 40 is at least one machine-readable storage medium, comprising a plurality of instructions that, responsive to being executed with processor circuitry of a computer-controlled device, cause the computer-controlled device to: implement an IM client and receive a chat message; configure a debugging trigger based on the chat message; initiate a debug process, in response to the debugging trigger, including gathering device state data from a device in response to a debugging trigger, the device state data including a stack trace dump and a memory core dump; store the device state data within a memory image, the memory image being an input to a debugger to execute a debug process.

In Example 41, the subject matter of Example 40 optionally includes wherein the computer-controlled device further includes the debugger to execute the debugging process based on the memory image.

In Example 42, the subject matter of any one or more of Examples 40-41 optionally include the instructions further causing the computer-controlled device to transmit the memory image via the IM client to a remote debugger to execute the debugging process based on the memory image.

In Example 43, the subject matter of any one or more of Examples 40-42 optionally include wherein data transferred via the IM client is encoded in at least one of ASCII or Unicode.

In Example 44, the subject matter of any one or more of Examples 40-43 optionally include wherein the device includes at least one of an embedded device and an internet of things (IoT) device.

In Example 45, the subject matter of any one or more of Examples 40-44 optionally include wherein the memory core dump further includes at least one of a device memory state and a device register state.

In Example 46, the subject matter of any one or more of Examples 40-45 optionally include wherein the instructions further causing the computer-controlled device to execute the debugging process includes instructions further causing the computer-controlled device to recreate a device state based on the memory image.

In Example 47, the subject matter of any one or more of Examples 40-46 optionally include wherein the stack trace dump includes a plurality of instructions on a device stack.

In Example 48, the subject matter of Example 47 optionally includes wherein the instructions further causing the computer-controlled device to execute the debugging process includes instructions further causing the computer-controlled device to recreate a plurality of operating instructions that led to the debugging trigger.

In Example 49, the subject matter of any one or more of Examples 40-48 optionally include wherein the debugging trigger includes at least one of a device malfunction, a user-initiated trigger, and an unplanned restart.

In Example 50, the subject matter of any one or more of Examples 40-49 optionally include instructions causing the computer-controlled device to analyze the device state data to determine whether to execute the debugging process locally or remotely.

In Example 51, the subject matter of any one or more of Examples 40-50 optionally include the instructions further causing the computer-controlled device to send the memory image to a remote device to execute the debugging process.

In Example 52, the subject matter of Example 51 optionally includes the instructions further causing the computer-controlled device to receive the debugging trigger at the device from the remote device.

In Example 53, the subject matter of Example 52 optionally includes wherein the instructions causing the computer-controlled device to receive the debugging trigger at the device from the remote device further includes instructions causing the computer-controlled device to: receive an encrypted remote command from the remote device; and decrypt the encrypted remote command to generate the debugging trigger.

In Example 54, the subject matter of Example 53 optionally includes wherein the instructions causing the computer-controlled device to decrypt the encrypted remote command includes instructions further causing the computer-controlled device to decrypt the encrypted remote command based on a plurality of encryption keys stored on the device.

In Example 55, the subject matter of Example 54 optionally includes wherein the instructions causing the computer-controlled device to store the gathered data within the memory image includes instructions further causing the computer-controlled device to encrypt the gathered data within the memory image based on the plurality of encryption keys stored on the device.

In Example 56, the subject matter of any one or more of Examples 40-55 optionally include wherein: the instructions causing the computer-controlled device to store the gathered data within the memory image includes instructions further causing the computer-controlled device to store the memory image on the device; and the instructions causing the computer-controlled device to execute the debugging process includes instructions further causing the computer-controlled device to execute a debugging local process on the device.

In Example 57, the subject matter of Example 56 optionally includes wherein the instructions causing the computer-controlled device to store the memory image on the device includes instructions further causing the computer-controlled device to store the memory image within at least one of a dynamic random access memory (DRAM) and a device hard disk drive (HDD).

Example 58 is a device debugging apparatus comprising: means for implementing an IM client and receive a chat message; means for configuring a debugging trigger based on the chat message; means for initiating a debug process, in response to the debugging trigger, including means for gathering device state data from a device in response to a debugging trigger, the device state data including a stack trace dump and a memory core dump; means for storing the device state data within a memory image, the memory image being an input to a debugger to execute a debug process.

In Example 59, the subject matter of Example 58 optionally includes wherein the device further includes the debugger to execute the debugging process based on the memory image.

In Example 60, the subject matter of any one or more of Examples 58-59 optionally include means for transmitting the memory image via the IM client to a remote debugger to execute the debugging process based on the memory image.

In Example 61, the subject matter of any one or more of Examples 58-60 optionally include wherein data transferred via the IM client is encoded in at least one of ASCII or Unicode.

In Example 62, the subject matter of any one or more of Examples 58-61 optionally include wherein the device includes at least one of an embedded device and an internet of things (IoT) device.

In Example 63, the subject matter of any one or more of Examples 58-62 optionally include wherein the memory core dump further includes at least one of a device memory state and a device register state.

In Example 64, the subject matter of any one or more of Examples 58-63 optionally include wherein means for executing the debugging process recreates a device state based on the memory image.

In Example 65, the subject matter of Example undefined optionally includes, wherein the means for executing the debugging process includes means for recreating a plurality of operating instructions that led to the debugging trigger.

In Example 66, the subject matter of any one or more of Examples 58-65 optionally include wherein the debugging trigger includes at least one of a device malfunction, a user-initiated trigger, and an unplanned restart.

In Example 67, the subject matter of any one or more of Examples 58-66 optionally include means for analyzing the device state data to determine whether to execute the debugging process locally or remotely.

In Example 68, the subject matter of any one or more of Examples 58-67 optionally include means for sending the memory image to a remote device to execute the debugging process.

In Example 69, the subject matter of Example 68 optionally includes means for receiving the debugging trigger at the device from the remote device.

In Example 70, the subject matter of Example 69 optionally includes wherein means for receiving the debugging trigger at the device from the remote device includes: means for receiving an encrypted remote command from the remote device; and means for decrypting the encrypted remote command to generate the debugging trigger.

In Example 71, the subject matter of Example 70 optionally includes wherein means for decrypting the encrypted remote command includes means for decrypting the encrypted remote command based on a plurality of encryption keys stored on the device.

In Example 72, the subject matter of Example 71 optionally includes wherein means for storing the gathered data within the memory image includes means for encrypting the gathered data within the memory image based on the plurality of encryption keys stored on the device.

In Example 73, the subject matter of any one or more of Examples 58-72 optionally include wherein: means for storing the gathered data within the memory image includes means for storing the memory image on the device; and means for executing the debugging process includes means for executing a debugging local process on the device.

In Example 74, the subject matter of Example 73 optionally includes wherein means for storing the memory image on the device includes means for storing the memory image within at least one of a dynamic random access memory (DRAM) and a device hard disk drive (HDD).

Example 75 is a remote debugging apparatus comprising a debugging server to receive an encrypted remote command from a remote debugging console device, decrypt the encrypted remote command into a decrypted remote command, and send the decrypted remote command to a device under test.

In Example 76, the subject matter of Example 75 optionally includes wherein the debugging server is further configured to: receive a debugging output from the device under test; encrypt the debugging output into an encrypted debugging output; and send the encrypted debugging output to the remote debugging console device.

In Example 77, the subject matter of Example 76 optionally includes wherein the debugging server is further configured to connect to the debugging console device via a communication infrastructure.

In Example 78, the subject matter of any one or more of Examples 76-77 optionally include wherein the communication infrastructure includes an instant messaging platform.

In Example 79, the subject matter of any one or more of Examples 76-78 optionally include wherein the debugging server further includes a debugging software.

In Example 80, the subject matter of any one or more of Examples 76-79 optionally include wherein the debugging server further includes a communication client.

In Example 81, the subject matter of any one or more of Examples 76-80 optionally include wherein the debugging server further includes a communication encryption key.

In Example 82, the subject matter of any one or more of Examples 76-81 optionally include wherein the debugging server is further configured to connect to a user interface between the system under test and the debugging server.

In Example 83, the subject matter of any one or more of Examples 76-82 optionally include wherein the debugging server is further configured to connect to a back-side-bus (BSSB) device, the BSSB to provide a connection adapter to connect to a plurality of hardware ports.

In Example 84, the subject matter of any one or more of Examples 76-83 optionally include wherein the debugging server is further configured to connect to an automatic power supply (APS).

In Example 85, the subject matter of any one or more of Examples 76-84 optionally include wherein the debugging server is further configured to connect to a web camera for physical device-under-test inspection.

Example 86 is a remote debugging method comprising: receiving an encrypted remote command from a remote debugging console device at a debugging server; decrypting the encrypted remote command into a decrypted remote command; sending the decrypted remote command to a device under test; receiving a debugging output from the device under test; encrypting the debugging output into an encrypted debugging output; and sending the encrypted debugging output to the remote debugging console device.

In Example 87, the subject matter of Example 86 optionally includes receiving, at the debugging server, a debugging output from the device under test; encrypting the debugging output into an encrypted debugging output; and sending the encrypted debugging output to the remote debugging console device from the debugging server.

In Example 88, the subject matter of Example 87 optionally includes connecting to the debugging console device via a communication infrastructure.

In Example 89, the subject matter of any one or more of Examples 87-88 optionally include wherein the debugging server further includes a debugging software.

In Example 90, the subject matter of any one or more of Examples 87-89 optionally include wherein the debugging server further includes a communication client.

In Example 91, the subject matter of any one or more of Examples 87-90 optionally include wherein the debugging server further includes a communication encryption key.

In Example 92, the subject matter of any one or more of Examples 87-91 optionally include connecting to a user interface between the system under test and the debugging server.

In Example 93, the subject matter of any one or more of Examples 87-92 optionally include connecting to a back-side-bus (BSSB) device, the BSSB to provide a connection adapter to connect to a plurality of hardware ports.

In Example 94, the subject matter of any one or more of Examples 87-93 optionally include connecting to an automatic power supply (APS).

In Example 95, the subject matter of any one or more of Examples 87-94 optionally include connecting to an optional web camera for physical device-under-test inspection.

Example 96 is at least one machine-readable medium including instructions, which when executed by a computing system, cause the computing system to perform any of the methods of Examples 86-95.

Example 97 is an apparatus comprising means for performing any of the methods of Examples 86-95.

Example 98 is at least one machine-readable storage medium, comprising a plurality of instructions that, responsive to being executed with processor circuitry of a computer-controlled device, cause the computer-controlled device to receive an encrypted remote command from a remote debugging console device, decrypt the encrypted remote command into a decrypted remote command, and send the decrypted remote command to a device under test.

Example 99 is a remote debugging apparatus comprising: means for receiving an encrypted remote command from a remote debugging console device at a debugging server; means for decrypting the encrypted remote command into a decrypted remote command; means for sending the decrypted remote command to a device under test; means for receiving a debugging output from the device under test; means for encrypting the debugging output into an encrypted debugging output; and means for sending the encrypted debugging output to the remote debugging console device.

Example 100 is at least one machine-readable medium including instructions, which when executed by a machine, cause the machine to perform operations of any of the operations of Examples 1-96.

Example 101 is an apparatus comprising means for performing any of the operations of Examples 1-96.

Example 102 is a system to perform the operations of any of the Examples 1-96.

Example 103 is a method to perform the operations of any of the Examples 1-96.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device debugging system comprising:
   a processor to:
   implement an instant messaging (IM) client and receive a chat message;
   configure a debugging trigger based on the chat message;
   initiate a debugging process, in response to the debugging trigger, including gathering device state data from a device, the device state data including a stack trace dump and a memory core dump; and
   analyze the device state data to determine whether to execute the debugging process locally or remotely; and
   a memory to store the device state data within a memory image, the memory image being an input to a debugger to execute the debugging process.

2. The device debugging system of claim 1, wherein the device further includes the debugger to execute the debugging process based on the memory image.

3. The device debugging system of claim 1, wherein the processor is to transmit the memory image via the IM client to a remote debugger to execute the debugging process based on the memory image.

4. The device debugging system of claim 3, further including a network interface device.

5. The device debugging system of claim 4, wherein:
the network interface device sends the memory image to a remote device; and
the remote device includes the remote debugger to execute the debugging process.

6. The device debugging system of claim 1, wherein data transferred via the IM client is encoded in at least one of American Standard Code for Information Interchange (ASCII) or Unicode.

7. The device debugging system of claim 1, wherein the device includes at least one of an embedded device and an internet of things (IoT) device.

8. The device debugging system of claim 1, wherein the memory core dump includes at least one of a device memory state and a device register state.

9. The device debugging system of claim 1, wherein the debugger executing the debugging process recreates a device state based on the memory image.

10. The device debugging system of claim 1, wherein the stack trace dump includes a plurality of instructions on a device stack.

11. The device debugging system of claim 10, wherein the debugger executing the debugging process includes recreating a plurality of operating instructions that led to the debugging trigger.

12. A device debugging method comprising:
implementing an instant messaging (IM) client and receive a chat message;
configuring a debugging trigger based on the chat message;
initiating a debugging process, in response to the debugging trigger, including gathering device state data from a device, the device state data including a stack trace dump and a memory core dump;
storing the device state data within a memory image on the device under test, the memory image being an input to a debugger to execute the debugging process; and
executing a debugging local process on the device under test.

13. The device debugging method of claim 12, wherein the device further includes the debugger to execute the debugging process based on the memory image.

14. The device debugging method of claim 12, wherein the processor is to transmit the memory image via the client to a remote debugger to execute the debugging process based on the memory image.

15. At least one non-transitory machine-readable medium, comprising a plurality of instructions that, responsive to being executed with processor circuitry of a computer-controlled device, cause the computer-controlled device to:
implement an instant messaging OM) client and receive a chat message;
configure a debugging trigger based on the chat message;
initiate a debugging process, in response to the debugging trigger, including gathering device state data from a device under test, the device state data including a stack trace dump and a memory core dump;
store the device state data within a memory image on the device under test, the memory image being an input to a debugger to execute the debugging process; and
execute a debugging local process on the device under test.

16. The at least one non-transitory machine-readable medium of claim 15, the instructions further causing the debugger to execute the debugging process based on the memory image.

17. The at least one non-transitory machine-readable medium of claim 15, the instructions further causing the computer-controlled device to transmit the memory image via the IM client to a remote debugger to execute the debugging process based on the memory image.

18. The at least one non-transitory machine-readable medium of claim 15, wherein data transferred via the IM client is encoded in at least one of American Standard Code for Information Interchange (ASCII) or Unicode.

19. The at least one non-transitory machine-readable medium of claim 15, wherein the device under test includes at least one of an embedded device and an internet of things (IoT) device.

20. The at least one non-transitory machine-readable medium of claim 15, wherein the instructions further causing the computer-controlled device to execute the debugging process include instructions further causing the computer-controlled device to recreate a device state based on the memory image.

21. The at least one non-transitory machine-readable medium of claim 15, wherein the stack trace dump includes a plurality of instructions on a device stack.

22. The at least one non-transitory machine-readable medium of claim 15, wherein the debugging trigger includes at least one of a device malfunction, a user-initiated trigger, and an unplanned restart.

23. The at least one non-transitory machine-readable medium of claim 15, the instructions further causing the computer-controlled device to send the memory image to a remote device to execute the debugging process.

* * * * *